United States Patent
Kim

(10) Patent No.: US 10,047,310 B2
(45) Date of Patent: Aug. 14, 2018

(54) MULTISTAGE MEMBRANE SEPARATION AND PURIFICATION PROCESS AND APPARATUS FOR SEPARATING HIGH PURITY METHANE GAS

(71) Applicant: Korea Research Institute of Chemical Technology, Yuseong-gu, Daejeon (KR)

(72) Inventor: Jeong Hoon Kim, Yuseong-gu, Daejeon (KR)

(73) Assignee: Korea Research Institute of Chemical Technology, Daejeon (KR)

(*) Notice: Subject to any disclaimer, the term of this patent is extended or adjusted under 35 U.S.C. 154(b) by 0 days.

(21) Appl. No.: 15/462,004

(22) Filed: Mar. 17, 2017

(65) Prior Publication Data

US 2017/0198227 A1 Jul. 13, 2017

Related U.S. Application Data

(63) Continuation of application No. 15/512,217, filed as application No. PCT/KR2015/007930 on Jul. 29, 2015.

(30) Foreign Application Priority Data

Sep. 18, 2014 (KR) .................. 10-2014-0124168

(51) Int. Cl.
| | | |
|---|---|---|
| *C10L 3/10* | (2006.01) | |
| *B01D 53/22* | (2006.01) | |
| *B01D 71/68* | (2006.01) | |

(52) U.S. Cl.
CPC ............ *C10L 3/104* (2013.01); *B01D 53/226* (2013.01); *B01D 71/68* (2013.01); *B01D 2053/221* (2013.01); *C10L 2290/06* (2013.01); *C10L 2290/548* (2013.01)

(58) Field of Classification Search
CPC ............ B01D 2053/221; B01D 53/225; B01D 53/226; B01D 71/06; B01D 71/68; C07C 9/04; C10L 2290/06; C10L 2290/548; C10L 3/104; C01B 31/20; C02F 11/04
See application file for complete search history.

(56) References Cited

U.S. PATENT DOCUMENTS 8,999,038 B2 * 4/2015 Ungerank ............ B01D 53/226
                                                95/51
2004/0099138 A1    5/2004 Karode et al.

FOREIGN PATENT DOCUMENTS

| JP | 09-124514 A | 5/1997 |
|---|---|---|
| JP | 09-310082 A | 12/1997 |
| JP | 2007-254572 A | 10/2007 |
| JP | 2008-260739 A | 10/2008 |
| JP | 2009-242773 A | 10/2009 |
| JP | 2014-159543 A | 9/2014 |
| KR | 10-2011-0117809 A | 10/2011 |
| KR | 10-1086798 B1 | 11/2011 |
| KR | 10-1100321 B1 | 12/2011 |
| KR | 10-2012-0083220 A | 7/2012 |
| KR | 10-2012-0119755 A | 10/2012 |
| KR | 10-1327337 B1 | 11/2013 |
| KR | 1020140093193 A | 7/2014 |
| WO | 2012-000727 A1 | 1/2012 |

OTHER PUBLICATIONS

International Search Report and Written Opinion dated Nov. 5, 2015 for PCT Application No. PCT/KR2015/007930.

* cited by examiner

*Primary Examiner* — Sharon Pregler
(74) *Attorney, Agent, or Firm* — Bachman & LaPointe, P.C.

(57) ABSTRACT

The present invention provides a method for separating high purity methane gas from biogas, which comprises the steps of: compressing and cooling biogas (step 1); and separating carbon dioxide by introducing the biogas compressed and cooled in step 1 into a four-stage polymer separation membrane system in which the residue stream of the first polymer separation membrane is connected to the second polymer separation membrane, the residue stream of the second polymer separation membrane is connected to the third polymer separation membrane, and the permeate stream of the second polymer separation membrane is connected to the fourth polymer separation membrane (step 2).

10 Claims, 4 Drawing Sheets

MULTISTAGE MEMBRANE SEPARATION AND PURIFICATION PROCESS AND APPARATUS FOR SEPARATING HIGH PURITY METHANE GAS

CROSS-REFERENCE TO RELATED APPLICATIONS

This is a continuation application of U.S. patent application Ser. No. 15/512,217, filed Mar. 17, 2017, and entitled "Multistage Membrane Separation and Purification Process and Apparatus for Separating High Purity Methane Gas" which is the U.S. National Stage of PCT/KR2015/007930, filed Jul. 29, 2015, and entitled "Multistage Membrane Separation and Purification Process and Apparatus for Separating High Purity Methane Gas", the disclosure of which international application is incorporated by reference herein in its entirety as if set forth at length, and which claims priority of Korean Patent Application No. 10-2014-0124168, filed Sep. 18, 2014, and entitled "Multistage Membrane Separation and Purification Process and Apparatus for Separating High Purity Methane Gas", the disclosure of which Korean application is incorporated by reference herein in its entirety as if set forth at length.

BACKGROUND OF THE INVENTION

The present invention relates to a multi-stage membrane separation and purification process and an apparatus for separating high purity methane gas, wherein a 4-stage membrane recirculation process and operating conditions for the separation and purification of high purity methane gas from biogas are included.

The biogas generated by anaerobic digestion of food waste, organic waste, and livestock wastewater is mainly composed of methane (about 50~75 volume %) and carbon dioxide (about 25~50% volume %) and includes some minor impurities such as air (about 0.1 volume %), hydrogen sulfide (about 7,000~8,000 ppm), and siloxane (about 40 ppm).

Methane, the main component of biogas, is about 20 times more likely to contribute to than carbon dioxide, and is designated as a contributing about 18 volume %, which is about 49 volume %, Followed by carbon dioxide. The major component of the biogas is methane, which is designated as a greenhouse gas whose contribution to global warming is about 20 times higher than that of carbon dioxide and takes about 18 volume % next to carbon dioxide (about 49 volume %). Methane gas has the energy of 5,000 kcal/m$^3$, which is regarded as a renewable energy source that can be recycled.

The method for collecting the biogas and using the collected biogas as resources includes direct burning, electricity production, supply to city gas, and use as automobile fuel, etc. Various application methods are under development according to the generation background of methane gas and its economics. Among them, the highly economical method with high energy efficiency is the method for preparing high purity methane gas fuel having at least 95% purity usable as city gas or automobile fuel through the purification process increasing energy content, that is the methane concentration, with high purity from biogas. This method is more economical than the method using it for the production of electricity, so that world-wide countries including Sweden and Germany are attempting to use such methane gas as a high purity fuel. The high purity methane gas can be applied to any conventional city gas apparatus and natural gas vehicle without exchanging equipments. Therefore, this gas is expected as a next generation clean bio-energy, and the advanced countries especially advanced with the renewable energy including Sweden and Germany establish national plans for using biogas instead of natural gas.

Various techniques usable for the separation process and plant for obtaining high purity biogas, and the operation conditions thereof have been developed. The method to produce high purity bio-methane is composed of two techniques: pre-treatment technique to eliminate impurities remaining in the biogas such as siloxane, ammonia, hydrogen sulfide, and moisture from the biogas; and de-carbon dioxide separation technique to separate carbon dioxide and methane from each other. The de-carbon dioxide separation technique is exemplified by cryogenics characterized by direct separation at a low temperature, physical or chemical absorption using water or amines, pressure swing adsorption using zeolite or carbon adsorbent, and membrane separation using methane-specific polymer separation membrane.

The development and commercialization of the biogas high purity purification technique has been led by USA and EU countries. The representative companies retaining biogas purification technique are Malmberg, Purac, and Flotech in Sweden and Prometheus Energy in USA which use absorption using water, polyethylene glycol, or amines as an absorption liquid; Evonik in Germany, Air-liquides in France, and Acrion Technology in Austria which use separation membrane method using polyimide membrane or polysulfone membrane; and Schmack and Carbotech in Germany and Xebec in Canada which use adsorption using zeolite or carbon adsorbent. In addition, the hybrid process of membrane separation, cryogenics, and absorption is also researched and developed.

As an example of absorption method, Korean Patent Publication No. 10-2010-0037249 describes the purification system and method of high purity biogas. Precisely, the purification system and method of biogas above comprises the pre-treatment part to eliminate moisture, hydrogen sulfide, and siloxane in order for the biogas generated in the anaerobic digestion part to be used as a gas fuel; and either the gas adsorption part to eliminate carbon dioxide by using a adsorbent or the gas absorption part to absorb and dissolve carbon dioxide by using a absorbent.

Korean Patent Publication No. 10-2012-0083220 describes the methane recovering method and apparatus. Precisely, the method above comprises the steps of eliminating siloxane in the biogas by using a adsorbent; eliminating hydrogen sulfide in the course of reaction removal process wherein hydrogen sulfide is reacted with metal oxide to turn into metal sulfide and removed as the form of metal sulfide; capturing copper oxide in the course of capture process wherein oxygen in the biogas is reacted with copper-zinc oxide to turn into copper oxide and then copper oxide is captured; and concentrating methane in the course of concentration process wherein carbon dioxide in the biogas is separated and then methane is concentrated by pressure swing adsorption method.

However, the methane purification methods described above are based on carbon dioxide absorption process or PSA adsorption process. Therefore, the installation cost of the plant is high and the process operation cost is also high. Besides, the small-scale apparatus configuration is not possible, the purification efficiency is low, and the process is complicated and consumes a lot of energy.

It was believed that the membrane separation was more suitable for the domestic biogas purification facilities and it was easy to maintain and yield high purity methane. Unlike other separation methods, the membrane separation method is operable in dry process, which is advantageous in winter; is pro-environmental because of not using a toxic absorbent; costs less for the plant and operation; and is easy for scale-up and scale-down. So, the membrane separation method is expected to occupy a unique position in future biomethane purification technology.

The two most important targets in the membrane separation process are methane concentration and recovery rate. In the single-stage membrane separation process, the recovery rate is usually 60~75%. To increase the recovery rate of methane, a two-stage membrane separation process wherein the separation membrane is connected in two stages, the permeate of the first stage separation membrane is incinerated, and the permeate of the second stage separation membrane is recirculated is under development together with a three-stage membrane separation process wherein the permeate of the first stage separation membrane of the two-stage membrane separation process passes through the third stage separation membrane and methane gas that does not pass through the second stage separation membrane is recirculated.

Korean Patent Publication No. 10-2011-0037921 describes a low temperature biogas separation method as an example of the single-stage membrane separation process. In this method, the biogas generated in the anaerobic condition is changed into the compressed biogas of 7 bar through desulfurization process, siloxane removal process, compression process, and moisture removal process. Then, methane is purified from the compressed biogas through the single-stage membrane separation process using a polystyrene hollow fiber membrane module.

As a method to separate and collect methane and carbon dioxide from biogas through the membrane separation like the above, the single-stage membrane separation process has been used. However, the recovery rate of methane contained in the biogas is only about 70% or less with this method, indicating the methane collection is inefficient and the additional methane recovery process is required. And the energy consumed in the system is excessive, resulting in a low energy efficiency of the system.

To solve the problems above, the multi-stage membrane separation process has been developed to purify methane from biogas.

As an example of the multi-stage membrane separation process, Japanese Patent Publication No. 2007-254572 describes a methane concentration two-stage system and an operation method of the same. In this method, a mixed gas is provided to the first separation membrane and the non-permeated gas is provided to the other separation membrane in the back with increasing pressure. Carbon dioxide is passed through the second separation membrane, then. Accordingly, high concentration methane gas is collected. At this time, the carbon dioxide permeable membrane is preferably the DDR type zeolite membrane, according to the patent document.

Japanese Patent Publication No. 2008-260739 describes a two-stage methane concentration device and a methane concentration method. Precisely, this method comprises the following steps; a mixed gas is passed through the first separation membrane made of inorganic porous materials; and the non-permeated gas is passed through the second separation membrane made of inorganic porous materials. At this time, the separation membrane is made of inorganic porous materials.

US Patent Application Publication No. US 2004/0099138 describes a membrane separation process. According to this method, at least 98% methane was recovered from landfill gas by using a carbon dioxide absorption tower and a two-stage membrane separation process. The landfill gas was supplied to the two-stage membrane separation process through the first compression process, the dehumidification process, the second compression process, the heat exchange process and the carbon dioxide absorption process. The provided gas was compressed to 21 bar in the first compressor and compressed to 60 bar through the second compressor and heat exchanger to facilitate the operation of the carbon dioxide adsorption tower and heated to 30° C.

The gas compressed through the permeation part of the first separation membrane comprising 90% carbon dioxide and 10% methane and impurities was recirculated to the upper part of the carbon dioxide absorption tower. The gas that had passed through the permeation part of the second separation membrane was provided to the second compressor to increase the recovery rate of methane. In addition, Ecrion technology using the polyamide-imide membrane developed by Air Liquide, France, is an example of the two-stage recirculation membrane separation process. The two-stage membrane separation processes informed from the prior arts use various separation membranes. The disadvantage of the processes above is that the recovery rate of the purified methane having at least 95% purity is less than 90%.

Japanese Patent No. 2009-242773 describes a three-stage membrane separation process. Precisely, this method includes a methane concentration device wherein carbon dioxide is separated from the mixed gas composed of methane gas and carbon dioxide and methane gas is concentrated. This device includes the first compressor compressing methane gas by the separation membrane letting carbon dioxide pass through first from the mixed gas; the second compressor to compress methane gas from the non-permeated gas remaining in the first compressor by using the separation membrane letting carbon dioxide pass through first; and the recovery device to collect methane gas from the gas that passed through the first compressor by using the separation membrane above. The separation membrane herein is preferably a polyimide membrane according to the patent document. However, the area ratio is similar between the first and the second stage separation membrane and the area of the third stage separation membrane is simply smaller than the first stage separation membrane, suggesting that the process condition including temperature or membrane area is not concrete. Therefore, this method is considered not so promising for the commercialization requiring high methane purity and recovery rate.

A three-stage membrane separation process was first developed in 2010 and commercialized by Evonik Co., Germany. This company has been actively studying on the membrane separation process with the polyimide (P84) hollow fiber membrane developed by themselves since 2008. As a result, a three-stage membrane separation recirculation process is patented and commercialized. Particularly, the said company has a patent of a three-stage process wherein the permeate is recirculated from the second stage in the first-stage and second-stage in-stream permeate to the stepwise arrangement and recompression by the retentate (PCT/EP2011/058636). The separation membrane used in this method is made of a material comprising methane/carbon dioxide ratio of at least 35. According to the reports about the three-stage membrane separation process made by Evonik Co., the polyimide membrane displays 50% higher selectivity than the polysulfone membrane.

Thus, according to the reports methane yield from the gas comprising methane concentration of about 98% reaches 99% through the three-stage process at a high pressure of 16~20 bar. The polysulfone membrane selected in the example of the present invention displayed at least 300% of recycling rate but the polyimide membrane showed up to 50% of recycling rate.

As shown in Table 1 below, the conventional polyimide material is expensive, so that the membrane production with this material costs high. The selectivity of carbon dioxide/methane of this material is relatively high (about 50) and the carbon dioxide permeability is low (less than several barrels). So, in order to save the separation membrane, a high pressure operation condition is required. However, for such a high pressure operation, costs for the plant equipment including compressor, piping, measurement equipment, and membrane as well are high and also energy consumption for the high pressure operation is also increased. Besides, the location for the plant is limited with considering the risks of plant mal-functioning or methane gas explosion. There is another disadvantage that the cost of replacing the membrane due to contamination of the membrane during the operation is high, which makes it difficult to develop the market.

As shown in Table 1, such membranes as polysulfone membrane, cellulose membrane, acetate membrane, and polycarbonate membrane are comparatively less expensive than polyimide membrane. Even though they have low carbon dioxide/methane selectivity, they show high carbon dioxide permeability. So, the membrane module thereof is not expensive and the permeability is high, suggesting that the required number of membranes for the device is small, indicating the plant construction costs less and the membrane replacement for exchanging the contaminated membrane costs less, too. If a separation membrane made of a polymer separation membrane with as low selectivity as 20 or under is used for the process, the volume of recycled gas to yield high purity methane would be too big and accordingly energy consumption will be huge. On the other hand, if polyimide having as high selectivity as at least 50 is used as a membrane material, which usually displays very low permeability, the yield of high purity methane would be small but the volume of gas for recycling would be bigger, suggesting that many separation membranes and high pressure operation condition are required, and as a result the scale of the device required in the process would be big. If only the optimum operation condition that can recover high purity methane with high yield can be secured by using a high permeability material, polysulfone, cellulose, acetate, and polycarbonate having a medium carbon dioxide/methane selectivity of 20~34 can be preferred as a separation membrane material. In addition, the separation membrane having high carbon dioxide permeability of 100 GPU~1,000 GPU developed as an asymmetric hollow fiber membrane or composite flat membrane would be also preferred as a separation membrane. Polysulfone (PS) having slightly lower selectivity but higher carbon dioxide permeability than polyimide and having high resistance against plasticization of carbon dioxide by high supply side pressure would be preferred, too. Particularly, the price of polysulfone as a separation membrane is only 1/20 of the price of polyimide, so that it is advantageous for the membrane replacement required when the separation membrane is damaged by hydrogen sulfide, compaction, and contamination, etc. Unlike the high pressure operation process of Evonik Co., polysulfone having high permeability is usable under the low pressure operation condition, suggesting that the cost of separation membrane and piping can be saved and the operation is safe, and the cost for compressor and other related equipments can also be saved.

TABLE 1

| Polymer Type | $P_{CO2}$ (Barrer) | $P_{CO2}/P_{CH4}$ | |
|---|---|---|---|
| Polytrimethylsilylpropyne | 33100 | 2.0 | low selectivity |
| Silicone rubber | 3200 | 3.4 | high |
| Natural rubber | 130 | 4.6 | permeability |
| Polystyrene | 11 | 8.5 | |
| Polyamide(Nylon 6) | 0.16 | 11.2 | |
| Poly(vinyl chloride) | 0.16 | 15.1 | |
| Polycarbonate(Lexan ™) | 10.0 | 26.7 | medium |
| Polysulfone | 4.4 | 30.0 | selectivity |
| Polyethyleneterephthalate(Mylar ™) | 0.14 | 31.6 | medium |
| Cellulose acetate | 6.0 | 31.0 | permeability |
| Poly(ether imide)(Ultem ™) | 1.5 | 45.0 | high selectivity |
| Poly(ether sulfone)(Victrex ™) | 3.4 | 50.0 | low |
| Polyimide(Kapton ™) | 0.2 | 64.0 | permeability |

1 Barrer = $10^{-10}$ cm$^3$ · cm · cm$^{-2}$ · s$^{-1}$ · cmHg$^{-1}$
*$P_{CO2}$ = carbon dioxide permeability
*$P_{CO2}/P_{CH4}$ = carbon dioxide/methane selectivity
*Basic principles of Membrane Technology (second edition), Kluwer Academic Publishers, Marcel Mulder.

As an example of the multi-stage membrane separation process patented in Korea, Korean Patent No. 10-1086798 describes a separation method for high purity methane gas from landfill gas and a separation apparatus for methane gas. Precisely, the method comprises the pretreatment step which is similar to the above but can be performed at a low pressure and a low temperature (7~15 bar, 10~50° C.); and the combination of two-stage membrane separation process and pressure swing adsorption process for the recovery of high purity methane. However, the use of the method above is limited to landfill gas, which means it targets the gas containing nitrogen and oxygen which are not included in biogas, so that the operation condition is different. In particular, this method includes PSA treatment process targeting the gas remaining not permeated through the separation membrane. So, it is not suitable for the process of biogas that does not contain nitrogen or oxygen but contains a low concentration of hydrogen sulfide and a high concentration of methane.

Korean Patent No. 10-1100321 describes a system for purifying/upgrading and compressing biogas. Precisely, the biogas produced in the anaerobic digestion biogas facility was upgraded by using a siloxane removal device, a desulfurization device, a compression device, a gas heater, and a two-stage membrane separation device, according to the system above. In the system, the provided gas was compressed to 10 bar through the compression device, which was heated to 50° C. by using the gas heater before it would be supplied to the membrane separation device. However, such a high temperature operation condition accelerates plasticization of a polymer membrane, resulting in the low methane/carbon dioxide selectivity. In addition, the ratio of upper part pressure/lower part pressure is low but the supply side temperature is too high. Therefore, it is considered that the feasibility is low.

Further, Korean Patent Publication No. 10-2014-0005846 describes a process for separation of gases. In this method, a gas separation module having the selectivity of at least 35 was used to yield high efficiency even at a high pressure of 9~75 bar at the supply side and 3~10 bar at the permeation side. The pressure and selectivity dependent separation results are described in the patent document and the disadvantages of the membrane separation processes having various stage patterns from the single-stage to the three-stage are also described therein. The process above is running at a high pressure so that energy and plant costs are high, which is another disadvantage.

Korean Patent No. 10-1327337 describes a multi-stage membrane separation system and method thereof for production of biomethane and recovery of carbon dioxide. Precisely in this method, the membrane separation structure was formed in multi-stage. Carbon dioxide recovered primarily through the separation membrane was passed through the separation membrane again to give high purity carbon dioxide. In particular, the temperature of the compressed gas was regulated in the range of 20~30° C. to prevent condensate generation after eliminating moisture. Then, pressure was applied to biogas at 10~20 bar. However, as shown in FIG. 3, the recirculation process is described at the rear end of the compressor. Therefore, it is predicted that efficient process operation will be technically difficult.

The described methods above for the purification of methane through two-stage or three-stage processes have disadvantages of high operation temperature or pressure, high area ratio, high upper part/lower part pressure ratio, in addition to the high price of a membrane material because the system uses a high price polymer material or an inorganic membrane material having a high selectivity. Only one or two operation conditions among the above-mentioned process conditions were considered and the results of those operations were not precisely described, suggesting that the feasibility of the process seems not easy due to the unsatisfactory yield of the process.

In the case of purifying biogas with variable methane concentration, particularly in the case of purifying biogas having a low concentration of methane, it is more difficult to obtain high purity methane.

In the course of study about the method for separating methane gas by membrane separation, the present inventors developed a method for separating high purity methane gas having at least 95% purity with a high recovery rate of at least 90% by performing a three-stage membrane separation process using a polymer separation membrane prepared with a low price polymer material such as polysulfone characterized by high carbon dioxide permeability and relatively high methane/carbon dioxide selectivity that is lower than those of polyimide but comparatively higher than others, wherein the conditions such as operation temperature, operation pressure, and pressure ratio of upper part/lower part were all optimized to increase the specific selectivity of the polymer separation membrane most and also the total area ratio and stage area ratio of the gas separation membrane were optimized. The present inventors also developed another method for the separation of high purity methane gas having at least 95% purity by using a four-stage membrane separation process using an inexpensive polymer separation membrane whose module per unit area costs is low due to the excellent workability, leading to the completion of the present invention.

SUMMARY OF THE INVENTION

It is an object of the present invention to provide a multi-stage membrane separation and purification process and an apparatus for separating high purity methane gas.

To achieve the above object, the present invention provides a method for separating high purity methane gas from biogas, which comprises the following steps:

compressing and cooling biogas (step 1); and separating carbon dioxide by introducing the biogas compressed and cooled in step 1 into a four-stage polymer separation membrane system in which the residue stream of the first polymer separation membrane is connected to the second polymer separation membrane; the residue stream of the second polymer separation membrane is connected to the third polymer separation membrane; and the permeate stream of the second polymer separation membrane is connected to the fourth polymer separation membrane (step 2).

The present invention also provides an apparatus for purifying methane gas comprising:

supply part to supply biogas;

compression and cooling part to compress and cool down the biogas supplied from the supply part; and purification part containing the 4-stage polymer separation membrane system for gas separation to separate carbon dioxide from the gas compressed and cooled down in the compression and cooling part wherein the residue stream of the first polymer separation membrane is connected to the second polymer separation membrane, the residue streams of the second polymer separation membrane is connected to the third polymer separation membrane, and the permeate stream of the second polymer separation membrane is connected to the fourth polymer separation membrane.

In addition, the present invention provides a methane gas having a purity of at least 95% separated by the above method.

Further, the present invention provides an automobile fuel and city gas containing the high purity methane gas above.

The method for separating high purity methane gas from biogas of the present invention is effective in producing high purity methane from the biogas generated from food waste and organic substances.

The method of the present invention is also effective in separating high purity methane gas from different biogases that contain different concentrations of methane gas through the 4-stage membrane separation process. Precisely, the 4-stage membrane separation process can purify even a small amount of remaining methane through recycling thereof, so that the yield of methane can be increased. Further, according to this method, high purity carbon dioxide can be separated independently through the first stage polymer separation membrane, so that this method is advantageous in the aspects of recovery rate and purity, compared with two-stage or three-stage process for biogas containing high concentration of carbon dioxide.

BRIEF DESCRIPTION OF THE DRAWINGS

The application of the preferred embodiments of the present invention is best understood with reference to the accompanying drawings, wherein.

DETAILED DESCRIPTION

Figure 1:
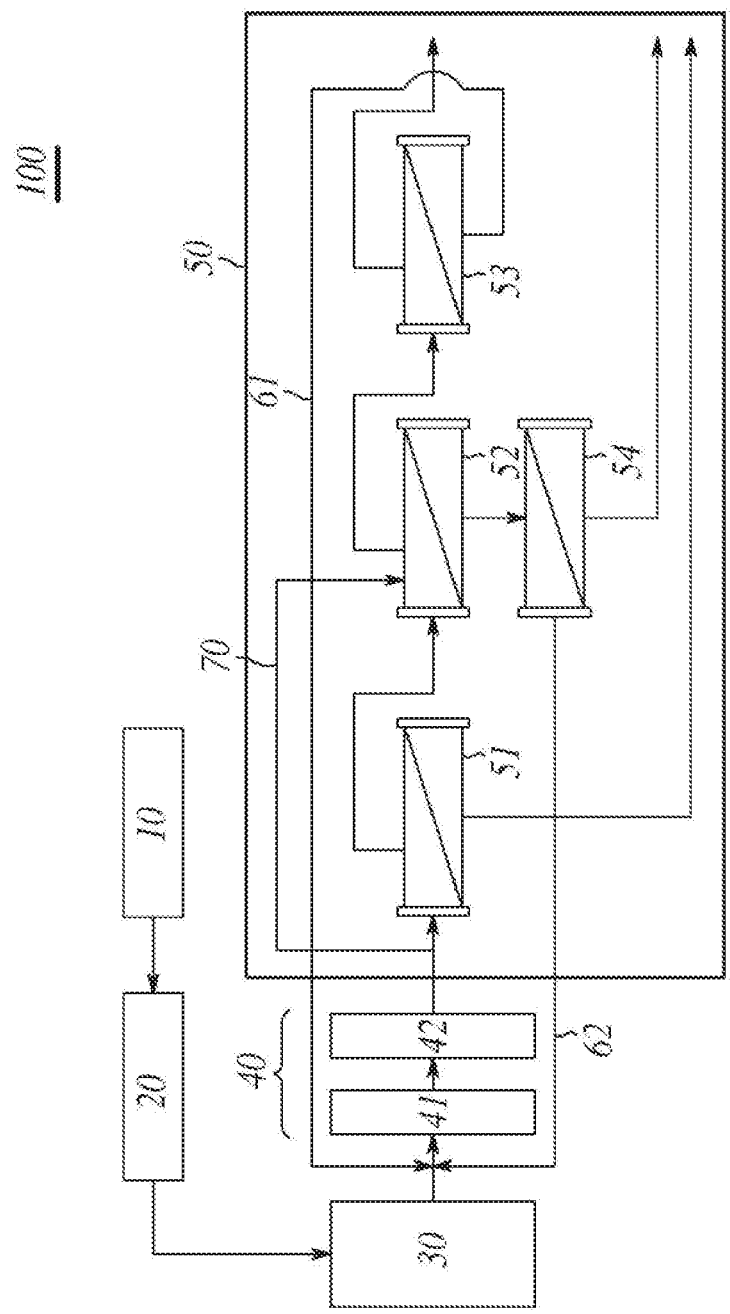
FIG. 1 is a schematic diagram illustrating an example of a methane gas purification device according to an example of the present invention.

Hereinafter, the present invention is described in detail.

The method for separating high purity methane gas according to an example of the present invention comprises the steps of compressing and cooling biogas (step 1); and separating carbon dioxide by introducing the biogas compressed and cooled in step 1 into a polymer separation membrane system (step 2).

The method for separating high purity methane gas according to an example of the present invention can additionally include the step of recirculating the gas back to the stage before the compression of step 1 above (step 3) in addition to the steps of compressing and cooling biogas (step 1); and separating carbon dioxide by introducing the biogas compressed and cooled in step 1 into a polymer separation membrane system (step 2). At this time, in step 1, the biogas is compressed at the pressure of 3 bar~11 bar and cooled down at the temperature of −20° C.~10° C. In step 2, the biogas compressed and cooled down in step 1 is introduced into the three-stage polymer separation membrane system for gas separation wherein the ratio of area among the first polymer separation membrane, the second polymer separation membrane, and the third polymer separation membrane is 1:1:1; the residue stream of the first polymer separation membrane is connected to the second polymer separation membrane; and the residue stream of the second polymer separation membrane is connected to the third polymer separation membrane. At this time, the pressure of the permeation part of the first polymer separation membrane, the permeation part of the second polymer separation membrane, and the permeation part of the third polymer separation membrane is maintained at 0.2~0.9 bar, during which methane and carbon dioxide are separated. In step 3, the reduced pressure condition in the permeation part of the second polymer separation membrane is maintained and the gas is recirculated back to the stage before the compression of step 1 together with the residue stream of the third polymer separation membrane. At this time, the carbon dioxide permeability of the polymer separation membrane is 100 GPU~1,000 GPU, and the carbon dioxide/methane selectivity is 20~34.

The method for separating high purity methane gas according to an example of the present invention is effective in producing high purity methane from the biogas generated from food waste and organic substances. In this method, a small amount of remaining methane after the third-stage separation membrane process can be recirculated and purified again, suggesting that the yield of methane can be increased. Further in this method, before carbon dioxide is separated by supplying biogas to the polymer separation membrane, the temperature of biogas is lowered and then supplied the same to the polymer separation membrane, by which supply side pressure and permeation side pressure can be regulated low. Also, the ratio of area among each separation membrane is optimized. Therefore, compared to the conventional methane purification methods, the method of the present invention is advantageous and effective in methane gas separation with the high yield of high purity methane, reduced operation energy costs (methane purification device construction costs, methane purification device operation costs), and advantage of safe operation.

The method for separating high purity methane gas according to an example of the present invention comprises the steps compressing and cooling biogas (step 1) and separating carbon dioxide by introducing the biogas compressed and cooled in step 1 into the polymer separation membrane system (step 2). In step 2, the biogas compressed and cooled in step 1 is introduced into the 4-stage polymer separation membrane system for gas separation to separate carbon dioxide, wherein the residue stream of the first polymer separation membrane is connected to the second polymer separation membrane; the residue stream of the second polymer separation membrane is connected to the third polymer separation membrane; and the permeate stream of the second polymer separation membrane is connected to the fourth polymer separation membrane.

The method for separating high purity methane gas according to another example of the present invention is effective in producing high purity methane from the biogas generated from food waste and organic substances. The method of the present invention is also effective in separating high purity methane gas from different biogases that contain different concentrations of methane gas through the 4-stage membrane separation process. Precisely, the 4-stage membrane separation process can purify even a small amount of remaining methane through recycling thereof, so that the yield of methane can be increased. Further, according to this method, high purity carbon dioxide can be separated independently through the first stage polymer separation membrane, so that this method is advantageous in the aspects of recovery rate and purity, compared with two-stage or three-stage process for biogas containing high concentration of carbon dioxide.

The apparatus for purifying methane gas according to an example of the present invention is composed of the biogas supply part; the compression and cooling part to compress and cool down the biogas supplied from the supply part; and the purification part containing the polymer separation membrane to eliminate carbon dioxide from the gas compressed and cooled down in the compression and cooling part.

The apparatus for purifying methane gas according to an example of the present invention can additionally include the recirculation in addition to the biogas supply part; the compression and cooling part to compress and cool down the biogas supplied from the supply part; and the purification part containing the polymer separation membrane to eliminate carbon dioxide from the gas compressed and cooled down in the compression and cooling part. At this time, in the compression and cooling part, the biogas is compressed at the pressure of 3 bar~11 bar and cooled down at the temperature of −20° C.~10° C. In the purification part, the biogas compressed and cooled down in step 1 is introduced into the three-stage polymer separation membrane system for gas separation wherein the ratio of area among the first polymer separation membrane, the second polymer separation membrane, and the third polymer separation membrane is 1:1:1~1:5:1; the residue stream of the first polymer separation membrane is connected to the second polymer separation membrane; and the permeate stream of the first polymer separation membrane was connected to the third polymer separation membrane. In the recirculation line, the permeate stream of the second polymer separation membrane and the residue stream of the third polymer separation membrane are introduced into the compression and cooling part. At this time, the carbon dioxide permeability of the polymer separation membrane is 100 GPU~1,000 GPU, and the carbon dioxide/methane selectivity is 20~34.

The method for separating high purity methane gas according to an example of the present invention is effective in producing high purity methane from the biogas generated from food waste and organic substances. In this method, a small amount of remaining methane after the third-stage separation membrane process can be recirculated and purified again, suggesting that the yield of methane can be increased. Further in this method, before carbon dioxide is separated by supplying biogas to the polymer separation membrane, the temperature of biogas is lowered and then supplied the same to the polymer separation membrane, by which supply side pressure and permeation side pressure can be regulated low. Also, the ratio of area among each separation membrane is optimized. Therefore, compared to the conventional methane purification methods, the method of the present invention is advantageous and effective in methane gas separation with the high yield of high purity methane, reduced operation energy costs (methane purification device construction costs, methane purification device operation costs), and advantage of safe operation.

The apparatus for purifying methane gas according to another example of the present invention is composed of the biogas supply part; the compression and cooling part to compress and cool down the biogas supplied from the supply part; and the purification part containing the polymer separation membrane to eliminate carbon dioxide from the gas compressed and cooled down in the compression and cooling part wherein the residue stream of the first polymer separation membrane is connected to the second polymer separation membrane, the residue streams of the second polymer separation membrane is connected to the third polymer separation membrane, and the permeate stream of the second polymer separation membrane is connected to the fourth polymer separation membrane.

The apparatus for purifying methane gas according to another example of the present invention is effective in producing high purity methane from the biogas generated from food waste and organic substances. The apparatus of the present invention is also effective in separating high purity methane gas from different biogases that contain different concentrations of methane gas through the 4-stage membrane separation process. Precisely, the 4-stage membrane separation process can purify even a small amount of remaining methane through recycling thereof, so that the yield of methane can be increased. Further, according to this method, high purity carbon dioxide can be separated independently through the first stage polymer separation membrane, so that this apparatus is advantageous in the aspects of recovery rate and purity, compared with two-stage or three-stage process for biogas containing high concentration of carbon dioxide.

Hereinafter, the multi-stage membrane separation and purification process and the apparatus for separating high purity methane gas of the invention are described in more detail.

In an example of the present invention, the method comprises the steps of compressing and cooling biogas (step 1) and separating carbon dioxide by introducing the biogas compressed and cooled in step 1 into a polymer separation membrane system (step 2). The method can additionally include the step of recirculating the gas back to the stage before the compression of step 1 above (step 3). In step 1, the biogas is compressed at the pressure of 3 bar~11 bar and cooled down at the temperature of −20° C.~10° C. In step 2, the biogas compressed and cooled down in step 1 is introduced into the three-stage polymer separation membrane system for gas separation wherein the ratio of area among the first polymer separation membrane, the second polymer separation membrane, and the third polymer separation membrane is 1:1:1~1:5:1; the residue stream of the first polymer separation membrane is connected to the second polymer separation membrane; and the permeate stream of the first polymer separation membrane is connected to the third polymer separation membrane. At this time, the pressure of the permeation part of the first polymer separation membrane, the permeation part of the second polymer separation membrane, and the permeation part of the third polymer separation membrane is maintained at 0.2~0.9 bar, during which methane and carbon dioxide are separated. In step 3, the reduced pressure condition in the permeation part of the second polymer separation membrane is maintained and the gas is recirculated back to the stage before the compression of step 1 together with the residue stream of the third polymer separation membrane. At this time, the carbon dioxide permeability of the polymer separation membrane is 100 GPU~1,000 GPU, and the carbon dioxide/methane selectivity is 20~34.

The present invention provides a method for separating high purity methane gas from biogas, which includes the steps of:

compressing and cooling biogas (step 1);

separating carbon dioxide by introducing the biogas compressed and cooled in step 1 into the three-stage polymer separation membrane system for gas separation (step 2), wherein the ratio of area among the first polymer separation membrane, the second polymer separation membrane, and the third polymer separation membrane is 1:1:1~1:5:1; the residue stream of the first polymer separation membrane is connected to the second polymer separation membrane; and the permeate stream of the first polymer separation membrane is connected to the third polymer separation membrane; and recirculating the permeate stream of the second polymer separation membrane and the permeate stream of the third polymer separation membrane back to the stage before the compression of step 1 (step 3) and at this time, the carbon dioxide permeability of the polymer separation membrane is 100 GPU~1,000 GPU, and the carbon dioxide/methane selectivity is 20~34.

Hereinafter, the method for separating high purity methane gas from biogas is described in more detail, step by step.

First, in the method for separating high purity methane gas from biogas of the present invention, step 1 is to compress and cool biogas at the pressure of 3~11 bar and at the temperature of −20° C.~10° C.

Step 1 above is to compress and cool biogas, wherein the pressure and temperature is properly adjusted to perform the membrane separation process in order to separate high purity methane gas from biogas.

At this time, the compression and cooling in step 1 is performed preferably at the biogas temperature of −20° C.~10° C. If the temperature of the compressed and cooled biogas of step 2 is lower than −20° C., the selectivity of the polymer separation membrane would be increased, but cooling costs using the membrane separation apparatus would be increased. In particular, at that temperature, the separation membrane would be frozen and accordingly easily broken by any pressure. If the temperature is higher than 10° C., the selectivity of the polymer separation membrane would be significantly low, so that the methane yield and purity would be poor and the separation membrane could be easily damaged by heat.

In step 1, the compression and cooling process is preferably performed with regulating the pressure of the biogas in the upper part to be 3~11 bar and the pressure of the biogas in the lower part to be 0.2-0.9 bar. If the pressure of the compressed and cooled biogas in step 2 is less than 3 bar, the selectivity of the polymer separation membrane would be limited because of the decreased pressure ratio of the upper part pressure and the lower part pressure in the course of the membrane separation process, resulting in the significant decrease of methane purity and yield. If the pressure of the biogas is more than 11 bar, the selectivity would be decreased according to the plasticization caused by carbon dioxide in the course of the membrane separation process, resulting in the decrease of methane purity and yield and further in the damage of the separation membrane.

Further, the biogas of step 1 can include such impurities as 0.0001%~0.1% moisture, hydrogen sulfide, ammonia, siloxane, nitrogen, and oxygen. The composition of the biogas supplied in step 1 is mainly composed of methane (65~75 volume %) and carbon dioxide (25~35 volume %), and contains some minor ingredients such as hydrogen sulfide (1500~2500 ppm), siloxane (90~100 ppm), and moisture (3500~4500).

At this time, the biogas of step 1 can be pre-treated by the processes of dehumidification, desulfurization, deammonia, and desiloxane.

The biogas of step 1 can be pre-treated and at this time it is preferred to perform the dehumidification treatment first. The said dehumidification treatment is preferably performed first before the dry desulfurization and desiloxane treatment in order to protect a desulfurizing agent and a desiloxane agent. By the dehumidification treatment, the early termination of performance or poor performance by coagulation in adsorbents caused by moisture can be prevented. If the dry desulfurization or deammonia process is applied, the dehumidification treatment of biogas is preferably performed at the end of the wet process, which favors protecting the permeability of a separation membrane. The dehumidification treatment herein can be performed by making the biogas pass through the cylindrical dehumidifier equipped with a circulation tube through which cooling water provided from an outer chiller is circulating, but not always limited thereto.

When the dehumidification is performed, the dew point temperature of gas is preferably 0° C. or under, and more preferably −15° C.~−50° C. If the dew point temperature of the dehumidified gas is over 0° C., there would be a risk of corrosion in the device in the continued process and coagulation in various adsorbents would be observed in the course of the compression process thereafter, resulting in the poor performance. Therefore, the produced final methane gas might not be used as an automobile fuel.

The desulfurization herein is performed by dry desulfurization or wet desulfurization. Hydrogen sulfide included in the biogas generates foul smell and corrodes the machine, so that it needs to be eliminated. At this time, the dry desulfurization process is environmentally friendly compared with the wet desulfurization process, and the economic feasibility of the process is excellent because no additional waste water treatment process is required.

The desulfurization is performed by using an iron oxide tower and the desiloxane treatment is performed by using an impregnated activated carbon tower and a silica gel tower. Silica ($SiO_2$) is generated over the long haul and forms a solid impurities on the surface of siloxane by high heat generated in the compressor cylinder or by being burning in the engine when the finally produced methane gas is used as an automotive fuel, resulting in the short life of purification process device or engine parts. So, the pretreatment to eliminate siloxane is necessary. Iron oxide adsorbent adsorbs a large amount of hydrogen sulfide. Ammonia that has not been adsorbed is adsorbed by impregnated activated carbon adsorbent, and some siloxanes are also adsorbed. Finally, siloxane is adsorbed and removed in the silica gel tower. Thus, the desulfurization and desiloxane process can be operated without degrading the desulfurization and desiloxane performance even in an urgent situation, compared with the conventional desulfurization process composed of a single adsorbent, and each adsorbent can complement each other's functions.

The desulfurization and desiloxane treatment is preferably performed to make the concentration of hydrogen sulfide up to 20 ppm and the concentration of siloxane up to 0.1 ppb after the treatment. If hydrogen sulfide is included in the final product at the concentration exceeding 20 ppm, the product would smell stench and cause corrosion in the device when it is used as a fuel. If the concentration of siloxane is higher than 0.1 ppb, silica ($SiO_2$) is generated over the long haul and form a solid impurities on the surface by high heat generated in the compressor cylinder or by being burning in the engine when the finally produced methane gas is used as an automotive fuel, resulting in the short life of the purification process device or engine parts.

Deammonia treatment can be performed together with the desulfurization and desiloxane treatment. The biogas supplied in step 1 can include ammonia which can be removed by deammonia treatment.

Next, in the method for separating high purity methane gas from biogas according to the present invention, step 2 is to separate methane and carbon dioxide by introducing the biogas compressed and cooled down in step 1 into the three-stage polymer separation membrane system for gas separation wherein the ratio of area among the first polymer separation membrane, the second polymer separation membrane, and the third polymer separation membrane is 1:1:1~1:5:1, and the residue stream of the first polymer separation membrane is connected to the second polymer separation membrane and the permeate stream of the first polymer separation membrane is connected to the third polymer separation membrane with maintaining the pressure of the first polymer separation membrane permeation part, the second polymer separation membrane permeation part, and the third polymer separation membrane permeation part as reduced as 0.2~0.9 bar.

Particularly, the material used for the membrane separation process to separate carbon dioxide in step 2 is preferably a polymer material having the carbon dioxide/methane selectivity of 20~34. An amorphous or semi-crystalline polymer is more preferred for the material, which is exemplified by polysulfone, polycarbonate, polyethylene terephthalate, cellulose acetate, polyphenylene oxide, polysiloxane, polyethylene oxide, polypropylene oxide, and a mixture thereof. A polymer designed to have low selectivity to increase the permeability of carbon dioxide in the course of the production of a separation membrane material can be included in the criteria of the material.

At this time, it is preferable that the permeability of carbon dioxide is 100 GPU to 1,000 GPU in the case of a separation membrane in which a selective layer is processed into a thin film by a phase transfer method or a thin film coating method using an asymmetric composite membrane or a hollow fiber membrane. The unit for the permeability of carbon dioxide, GPU, indicates gas permission unit (1 GPU=$(10^{-6} \cdot cm^3)/(cm^2 \cdot sec \cdot mmHg)$), that is it indicates the volume ($cm^3$) of carbon dioxide that passes through a certain unit area ($cm^2$) of a separation membrane under a unit pressure (mmHg) for a designated unit time (sec).

In general, such separation membrane materials as polyethersulfone and polyimide have a high selectivity. However, in this invention, polysulfone that has a medium selectivity but has more excellent plasticization resistance against carbon dioxide than polyimide is used. If a separation membrane material that has a very low selectivity is used, a large amount of recirculating gas would be required to obtain high purity methane, indicating that energy consumption would be increased. On the other hand, a material having a high selectivity is used, the permeability would be generally lowered, so that the yield of high purity methane would not be as much and on the contrary the volume of recirculating gas would be bigger, which requires high pressure operation and accordingly requires a large scale facility. For that reasons, a separation membrane material having a medium selectivity is preferred. In particular, a polymer material such as polysulfone having higher resistance against plasticization caused by pressure than polyimide is more preferred.

In the study of a membrane separation process, it was confirmed that the methane yield or purity depends on not only the selectivity of a separation membrane but also the pressure ratio of the high pressure part and the low pressure part. That is, as pressure goes high, plasticization to carbon dioxide is increased. So, as selectivity is decreased, separation performance becomes poor. As the pressure ratio of the high pressure part and the low pressure part is greater, the better separation result is expected. If the pressure ratio is low, the methane purity or separation performance would be not satisfactory even with high selectivity.

Studies on the temperature dependent permeability of a separation membrane material proved that as the gas temperature gets down the selectivity goes high but the permeability goes down. Therefore, in the case of using polysulfone or cellulose acetate having higher permeability but lower selectivity than polyimide, it is suggested that a low temperature supply gas operation method is used in order to make up the disadvantage of a low selectivity in order to increase the separation efficiency in the process. Then, high purity methane with high recovery rate can be finally produced by the membrane separation process.

Considering the process efficiency in relation to the carbon dioxide concentration in the residue stream and the recovery rate, the polymer separation membrane system is preferably the three-stage separation membrane, wherein the ratio of area of the first polymer separation membrane, the second polymer separation membrane, and the third polymer separation membrane is preferably 1:1:1~1:5:1. If carbon dioxide is separated by a single separation membrane, the concentration of carbon dioxide in the residue stream is high and the recovery rate is low. If the ratio of area of the first polymer separation membrane, the second polymer separation membrane, and the third polymer separation membrane is less than 1:1:1 in step 2, the recovery rate and purity of methane would be poor due to the low selectivity of the polymer separation membrane but the volume of recirculating methane would be bigger so that energy consumption for the compression would be increased. If the ratio of area of the first polymer separation membrane, the second polymer separation membrane, and the third polymer separation membrane is more than 1:5:1, the recovery rate and purity of methane would be poor and equipment related costs including costs for the membrane separation process and piping would be increased.

Further, the pressure of the permeation parts of the first polymer separation membrane, the second polymer separation membrane, and the third polymer separation membrane in step 2 is preferably maintained as reduced as 0.2~0.9 bar. If the pressure of the permeation parts of the first polymer separation membrane, the second polymer separation membrane, and the third polymer separation membrane in step 2 is less than 0.2 bar, the costs for pressure reducing pump and operation costs are increased. On the other hand, if the pressure is more than 0.9 bar, the pressure ratio of the upper part/the lower part gets lower than 10, indicating the selectivity of the separation membrane cannot be fully used and accordingly the recovery rate and purity would be decreased.

Next, in the method for separating high purity methane gas from biogas according to the present invention, step 3 is to recirculate the residue stream of the third polymer separation membrane together with the permeate stream of the second polymer separation membrane back to the stage before the compression process of step 1 under reduced pressure.

To increase the recovery rate of the final product methane gas, it is preferred for the method of the invention to include an additional step of recirculating the permeate stream coming out of the second polymer separation membrane and the residue stream of the third polymer separation membrane, as the last product of the three-stage polymer membrane separation process, back to the compression and cooling stage.

As described above, the permeate stream of the second polymer separation membrane and the residue stream of the third polymer separation membrane are preferably recirculated to the compression and cooling stage and then the separation membrane process repeats in order to increase the recovery rate of methane gas. At this time, the gas coming out through the permeation part of the third polymer separation membrane is incinerated. The concentration of carbon dioxide obtained after the carbon dioxide separation stage is preferably up to 1 volume %. If the concentration of carbon dioxide in the final gas product is more than 1 volume %, the purity of the produced methane gas would be decreased, suggesting that it would not be usable as an automobile fuel or city gas energy.

The present invention also provides an apparatus for purifying methane gas comprising:

supply part to supply biogas;

compression and cooling part to compress and cool down the biogas supplied from the supply part; and purification part containing the three-stage polymer separation membrane system for gas separation to separate carbon dioxide from the gas compressed and cooled down in the compression and cooling part wherein the ratio of area of the first polymer separation membrane, the second polymer separation membrane, and the third polymer separation membrane is 1:1:1~1:5:1, and the residue stream of the first polymer separation membrane is connected to the second polymer separation membrane, and the permeate streams of the first polymer separation membrane is connected to the third polymer separation membrane; and recirculation line to introduce the permeate stream of the second polymer separation membrane and the residue stream of the third polymer separation membrane into the compression and cooling stage, wherein the polymer separation membrane has the carbon dioxide permeability of 100~1,000 GPU and the carbon dioxide/methane selectivity of 20~34.

FIG. 1 presents a diagram illustrating an example of the apparatus for purifying methane gas of the present invention. Hereinafter, the apparatus for purifying methane gas of the present invention is described in more detail with referring to FIG. 1.

In the apparatus for purifying methane gas of the present invention 100, the supply part 10 can be a device for the introduction of the biogas generated in a food-waste disposal site, a sewage treatment plant, a landfill site, and a wastewater treatment plant into the apparatus for purifying methane gas of the present invention, which is exemplified by a blower.

The apparatus for purifying methane gas of the present invention 100 can contain the dehumidification part 20 and the pretreatment part 30 to eliminate sulfur, ammonia and siloxane from the dehumidified gas. The dehumidification part 20 is not limited to a specific device and can be a cylindrical dehumidifier having a tube in which cooling water supplied from an external cooling device is circulated.

The pretreatment part 30 is to eliminate sulfur, ammonia, and siloxane from the dehumidified gas provided from the dehumidification part 20 can include the desulfurization device and the desiloxane device. At this time, the desulfurization device can include an iron oxide tower and the desiloxane device can include an iron oxide tower, an impregnated activated carbon tower, and a silica gel tower. Each device for the desiloxane treatment can be connected in series or in parallel. Iron oxide adsorbent adsorbs a large amount of hydrogen sulfide. Hydrogen sulfide that has not been adsorbed is adsorbed by impregnated activated carbon adsorbent, and some siloxanes are also adsorbed. The said desulfurization and desiloxane device can be operated without degrading the desulfurization and desiloxane performance even in an urgent situation, compared with the conventional desulfurization and desiloxane device composed of a single adsorbent, and each adsorbent can complement each other's functions.

In the apparatus for purifying methane gas of the present invention 100, the compression and cooling part 40 is a device for compressing and cooling biogas to make it suitable for the membrane separation process, which is though not limited to a specific compression and cooling device and any device that can compress and cool down gas can be used.

The compression and cooling part 40 is composed of the compression part 41 and the cooling part 42. The compression part 41 is to compress the biogas pretreated above in order to make it have a suitable pressure to fit the inlet pressure of the membrane separation process. At this time, the pressure of the compressed biogas is preferably 3~11 bar. If the pressure of the biogas compressed in the compression part is less than 3 bar, the selectivity of the polymer separation membrane would be reduced, resulting in the decrease of the pressure ratio of the upper part pressure/the lower part pressure in the membrane separation process, suggesting that the recovery rate and purity of methane would be significantly reduced. If the pressure is more than 11 bar, the selectivity is also reduced because of the plasticization caused by carbon dioxide in the membrane separation process and accordingly the recovery rate and purity of methane would be reduced or the separation membrane could be broken.

The cooling part 42 is to cool down the biogas in order to make it fit for the inlet temperature for the membrane separation process. The temperature of the cooled down gas is preferably $-20°$ C.~$10°$ C. If the temperature of the biogas cooled down in the cooling part above is lower than $-20°$ C., the selectivity of the polymer separation membrane would be high but the costs for the cooling system of the membrane separation apparatus would be increased. In particular, the separation membrane would be frozen to break easily under pressure. If the temperature above is over $10°$ C., the selectivity of the polymer separation membrane would be significantly reduced, and therefore the recovery rate and purity of methane would be lowered, too. Also, the separation membrane would be damaged by heat.

The cooling part 42 is functioning to prevent the increase of the biogas temperature caused by the heat of compression generated in the course of compressing biogas, and to cool down thereof, so that it is contributed to the increase of the production efficiency of the final methane product.

In the apparatus for purifying methane gas of the present invention 100, the purification part 50 is to separate methane and carbon dioxide by introducing the biogas compressed and cooled in the compression and cooling part 40 into the first polymer separation membrane 51, the second polymer separation membrane 52, and the third polymer separation membrane 53 connected in series in that order.

At this time, the ratio of area of the first polymer separation membrane 51, the second polymer separation membrane 52, and the third polymer separation membrane 53 is preferably 1:1:1~1:5:1. If CO2 carbon dioxide is separated by using a single separation membrane, the concentration of carbon dioxide in the residue stream would be high but the recovery rate would be poor. If the ratio of area of the first polymer separation membrane, the second polymer separation membrane, and the third polymer separation membrane is less than 1:1:1, the recovery rate and purity of methane would be poor due to the low selectivity of the polymer separation membrane but the volume of recirculating methane would be bigger so that energy consumption for the compression would be increased. If the ratio of area of the first polymer separation membrane, the second polymer separation membrane, and the third polymer separation membrane is more than 1:5:1, the recovery rate and purity of methane would be poor and equipment related costs including costs for the membrane separation process and piping would be increased.

The material used for the membrane separation process to separate carbon dioxide is preferably a polymer material having the carbon dioxide/methane selectivity of 20~34. An amorphous or semi-crystalline polymer is more preferred for the material, which is exemplified by polysulfone, polycarbonate, polyethylene terephthalate, cellulose acetate, polyphenylene oxide, poly siloxane, polyethylene oxide, polypropylene oxide, and a mixture thereof. A polymer designed to have low selectivity to increase the permeability of carbon dioxide in the course of the production of a separation membrane material can be included in the criteria of the material.

At this time, it is preferable that the permeability of carbon dioxide is 100 GPU to 1,000 GPU in the case of a separation membrane in which a selective layer is processed into a thin film by a phase transfer method or a thin film coating method using an asymmetric composite membrane or a hollow fiber membrane. The unit for the permeability of carbon dioxide, GPU, indicates gas permission unit (1 $GPU=(10^{-6}\cdot cm^3)/(cm^2\cdot sec\cdot mmHg)$), that is it indicates the volume ($cm^3$) of carbon dioxide that passes through a certain unit area ($cm^2$) of a separation membrane under a unit pressure (mmHg) for a designated unit time (sec).

In general, such separation membrane materials as polyethersulfone and polyimide have a high selectivity. However, in this invention, polysulfone and cellulose acetate that have a medium selectivity but have more excellent plasticization resistance against carbon dioxide than polyimide are used. If a separation membrane material that has a very low selectivity is used, a large amount of recirculating gas would be required to obtain high purity methane, indicating that energy consumption would be increased. On the other hand, a material having a high selectivity is used, the permeability would be generally lowered, so that the yield of high purity methane would not be as much and on the contrary the volume of recirculating gas would be bigger, which requires high pressure operation and accordingly requires a large scale facility. For that reasons, a separation membrane material having a medium selectivity is preferred. In particular, a polymer material such as polysulfone having higher resistance against plasticization caused by pressure than polyimide is more preferred.

The apparatus for purifying methane gas of the present invention preferably includes the first recirculation line 61 and the second recirculation line 62 to recirculate the permeate stream of the second polymer separation membrane 52 and the residue stream of the third polymer separation membrane 53 in the purification part 50 back to the compression and cooling part 40. The recovery rate of methane can be increased by recovering methane again by recirculating methane in the permeate stream.

The method for separating high purity methane gas from biogas is described in more detail hereinafter by referring the apparatus for purifying methane 100. Particularly, biogas is supplied from the biogas supply part 10. Moisture, sulfur, ammonia, and siloxane are eliminated when the biogas is traveling through the dehumidification part 20 and the pretreatment part 30. The pretreated biogas is compressed and cooled down at a proper pressure and temperature in the compression and cooling part 40. Next, when the biogas is supplied to the first polymer separation membrane 51 of the purification part 50, carbon dioxide included in the biogas passes through the first polymer separation membrane and moved to the third polymer separation membrane 53. At this time, methane passes through the residue part of the first polymer separation membrane. A certain amount of carbon dioxide is included in the gas that passes through the residue part of the first polymer separation membrane. The biogas containing carbon dioxide residue is supplied again to the second polymer separation membrane 52. As shown in the first polymer separation membrane process, most carbon dioxide in the biogas provided above passes through the second polymer separation membrane and the biogas passing through the residue part of the second polymer membrane can yield high purity methane (at least 95%). In the meantime, carbon dioxide included in the biogas supplied to the third polymer separation membrane from the permeation part of the first polymer separation membrane passes through the third polymer separation membrane and the gas coming out of the permeation part of the third polymer separation membrane is directly incinerated or transferred to the process for the collection of high purity carbon dioxide. At this time, the concentration of carbon dioxide coming out through the permeation part of the third polymer separation membrane is preferably at least 90% and more preferably 95~99%. If the concentration of carbon dioxide in the gas is less than 90%, the production efficiency of methane gas would be decreased. The gas passing through the permeation part of the first polymer separation membrane is supplied to the compression and cooling part through the second recirculation line 62 connected to the residue part of the third polymer separation membrane.

The pressure of the gas supplied to the first polymer separation membrane 51, the second polymer separation membrane 52, and the third polymer separation membrane 53 is preferably 3 bar~11 bar. It is also preferred to maintain the pressure of the permeation part as 0.2~0.9 bar and the ratio of the upper part pressure and the lower part pressure as 10~50. The pressure of the gas supplied to the first polymer separation membrane, the second polymer separation membrane, and the third polymer separation membrane is regulated by the compression part 41. To adjust the pressure of the permeation part above, a vacuum pump or a blower (not shown) can be used.

In addition, the present invention provides a methane gas having a purity of at least 95% separated by the above method.

The methane gas having a purity of at least 95% is produced from the biogas generated from food waste and organic substances by the method for separating methane gas of the present invention. The method for separating methane gas of the present invention is a three-stage membrane separation process as described above, which is characterized by the excellent methane yield by recirculating and purifying even a small amount of remaining methane through the three-stage membrane separation process.

Further, the present invention provides an automobile fuel and city gas containing the high purity methane gas above.

The method for separating methane gas of the present invention facilitates the separation of high purity methane by purifying the biogas generated in a food-waste disposal site, a sewage treatment plant, a landfill site, and a wastewater treatment plant and accordingly provides a efficient usability of methane. The purity of the separated methane gas is at least 95% and the recovery rate is at least 90%, and this high purity methane can be separated with low energy costs, low plant costs, and low operation costs. The high purity methane having a purity of at least 95% separated above can be used as an automobile fuel or city gas.

Practical and presently preferred embodiments of the present invention are illustrative as shown in the following Experimental Examples.

However, it will be appreciated that those skilled in the art, on consideration of this disclosure, may make modifications and improvements within the spirit and scope of the present invention.

EXPERIMENTAL EXAMPLE 1

Methane Gas Separation Efficiency according to Operation Pressure Investigation of the Methane Gas Separation Efficiency of the Method for Separating Methane Gas of the Present Invention according to the Operation Pressure To investigate the methane gas separation efficiency of the method for separating methane gas of the present invention according to the operation pressure in the course of the biogas compression process, the following experiment was performed.

Methane gas was purified from the biogas generated in the food waste disposal facility located in Paju City Facilities Management Cooperation by using the membrane separation module made of polysulfone (carbon dioxide/methane selectivity: 30, carbon dioxide permeability: 120 GPU). The composition of the biogas supplied thereto was as follows: methane (65~75 volume %), carbon dioxide (25~35 volume %), hydrogen sulfide (1500 ppm~2500 ppm), siloxane (90 ppm~100 ppm), and moisture (3500 ppm~4500 ppm). The supplied biogas was pretreated to reduce the concentrations of hydrogen sulfide and siloxane under 20 ppm and 0.1 ppb respectively. The dew point temperature was adjusted to −15° C. After dehumidification, the temperature was maintained at 10° C. The pressure of the biogas pretreated and supplied to the purification part was regulated to be 2~14 bar. The pressure of the permeation part of the first polysulfone hollow fiber membrane was maintained as 3 bar and the pressure of the permeation part of the second polysulfone hollow fiber membrane and the third polysulfone hollow fiber membrane was maintained as 0.8 bar. The ratio of area of the first polysulfone hollow fiber membrane, the second polysulfone hollow fiber membrane, and the third polysulfone hollow fiber membrane was 1:1:1. The flow rate of the supplied biogas for the membrane separation process was 100 L/min. The results are shown in Table 2.

As shown in Table 2, the recovery rate was calculated by the following mathematical formula 1 with the amount of the purified methane with the purity of 90~99% from the lower methane supplied.

$$\frac{(\text{residual flow rate} \times \text{methane concentration in residue part})}{(\text{supply flow rate} \times \text{methane concentration in supply part})} \quad \text{(Mathematical Formula 1)}$$

TABLE 2

| operation temperature (° C.) | supply flow rate (L/min) | supply pressure (bar) | area ratio of first polysulfone hollow fiber membrane:second polysulfone hollow fiber membrane:third polysulfone hollow fiber membrane | | second polysulfone hollow fiber membrane residue part | third polysulfone hollow fiber membrane permeation part | recovery rate (%) |
|---|---|---|---|---|---|---|---|
| 10 | 100 | 2 | 1:1:1 | flow rate (L/min) | 80.0 | | 87.7 |
| | | | | methane concentration (%) | 89.4 | 7.1 | |
| | | | | carbon dioxide concentration (%) | 10.6 | 92.9 | |
| | | 3 | | flow rate (L/min) | 71.2 | | 98.1 |
| | | | | methane concentration (%) | 96.4 | 5.5 | |
| | | | | carbon dioxide concentration (%) | 3.6 | 94.5 | |
| | | 8 | | flow rate (L/min) | 69.9 | | 97.5 |
| | | | | methane concentration (%) | 97.1 | 4.6 | |
| | | | | carbon dioxide concentration (%) | 2.9 | 95.4 | |
| | | 11 | | flow rate (L/min) | 66.3 | | 92.0 |
| | | | | methane concentration (%) | 97.8 | 2.7 | |
| | | | | carbon dioxide concentration (%) | 2.2 | 97.3 | |
| | | 14 | | flow rate (L/min) | 61.1 | | 82.7 |
| | | | | methane concentration (%) | 99.3 | 1.2 | |
| | | | | carbon dioxide concentration (%) | 0.7 | 98.8 | |

As shown in Table 2, when the experiment was performed under the same operation temperature and supply flow rate, which were 10° C. and 100 L/min, high purity methane (at least 95%) was separated with high recovery rate (at least 90%) at the operation pressure of 3~11 bar. The purity of the final methane product was increased as the pressure was increased. The recovery rate was reduced as the flow rate of the residue part of the second polysulfone hollow fiber membrane was decreased.

EXPERIMENTAL EXAMPLE 2

Methane Gas Separation Efficiency according to Permeation Part Pressure of First Polysulfone Hollow Fiber Membrane and Second Polysulfone Hollow Fiber Membrane Investigation of the Methane Gas Separation Efficiency of the Method for Separating Methane Gas of the Present Invention according to the Permeation Part Pressure of the First Polysulfone Hollow Fiber Membrane and the Second Polysulfone Hollow Fiber Membrane To investigate the methane gas separation efficiency of the method for separating methane gas of the present invention according to the permeation part pressure of the first polysulfone hollow fiber membrane and the second polysulfone hollow fiber membrane, the following experiment was performed.

To investigate the methane gas separation efficiency according to the pressure reduction in the permeation part of the first polysulfone hollow fiber membrane and the second polysulfone hollow fiber membrane, a blower was facilitated for the separation of methane gas.

Methane gas was purified from the biogas generated in the food waste disposal facility located in Paju City Facilities Management Cooperation by using the membrane separation module made of polysulfone (carbon dioxide/methane selectivity: 34, carbon dioxide permeability: 200 GPU). The composition of the biogas supplied thereto was as follows: methane (65~75 volume %), carbon dioxide (25~35 volume %), hydrogen sulfide (1500 ppm~2500 ppm), siloxane (90 ppm~100 ppm), and moisture (3500 ppm~4500 ppm). The supplied biogas was pretreated to reduce the concentrations of hydrogen sulfide and siloxane under 20 ppm and 0.1 ppb respectively. The dew point temperature was adjusted to −15° C. After dehumidification, the temperature was maintained at 0° C. The pressure of the biogas pretreated and supplied to the purification part was regulated to be 8 bar. The pressure of the permeation part of the first polysulfone hollow fiber membrane and the second polysulfone hollow fiber membrane was maintained as 0.5~1 bar. The ratio of area of the first polysulfone hollow fiber membrane, the second polysulfone hollow fiber membrane, and the third polysulfone hollow fiber membrane was 1:2:1. The flow rate of the supplied biogas for the membrane separation process was 100 L/min. The results are shown in Table 3.

TABLE 3

| operation temperature (° C.) | supply flow rate (L/min) | supply pressure (bar) | permeation part pressure of first polysulfone hollow fiber membrane and second polysulfone hollow fiber membrane (bar) | | second polysulfone hollow fiber membrane residue part | third polysulfone hollow fiber membrane permeation part | recovery rate (%) |
|---|---|---|---|---|---|---|---|
| 0 | 100 | 8 | 0.5 | flow rate (L/min) | 53.3 | | 98.4 |
| | | | | methane concentration (%) | 99.7 | 1.4 | |
| | | | | carbon dioxide concentration (%) | 0.3 | 98.6 | |
| | | | 0.8 | flow rate (L/min) | 66.9 | | 97.2 |
| | | | | methane concentration (%) | 97.9 | 3.0 | |
| | | | | carbon dioxide concentration (%) | 2.1 | 97.0 | |
| | | | 1 | flow rate (L/min) | 69.9 | | 89.2 |
| | | | | methane concentration (%) | 97.1 | 4.6 | |
| | | | | carbon dioxide concentration (%) | 2.9 | 95.4 | |

As shown in Table 3, the experiment was performed at the same operation temperature and flow rate, which were 0° C. and 100 L/min. At this time, when the operation pressure was 8 bar and the pressure of the permeation part of the first and the second polysulfone hollow fiber membrane was 0.5 and 0.8 bar, high purity methane (at least 95%) was separated with high recovery rate (at least 90%). The purity and recovery rate of the final methane product were increased as the pressure of the permeation part was decreased.

EXPERIMENTAL EXAMPLE 3

Methane Gas Separation Efficiency according to Operation Temperature Investigation of the Methane Gas Separation Efficiency of the Method for Separating Methane Gas of the Present Invention according to the Operation Temperature To investigate the methane gas separation efficiency of the method for separating methane gas of the present invention according to the operation temperature, the following experiment was performed.

Methane gas was purified from the biogas generated in the food waste disposal facility located in Paju City Facilities Management Cooperation by using the membrane separation module made of polysulfone (carbon dioxide/methane selectivity: 33, carbon dioxide permeability: 120 GPU). The composition of the biogas supplied thereto was as follows: methane (65~75 volume %), carbon dioxide (25~35 volume %), hydrogen sulfide (1500 ppm~2500 ppm), siloxane (90 ppm~100 ppm), and moisture (3500 ppm~4500 ppm). The supplied biogas was pretreated to reduce the concentrations of hydrogen sulfide and siloxane under 20 ppm and 0.1 ppb respectively. The dew point temperature was adjusted to −15° C. After dehumidification, the temperature was maintained at −15° C.~35° C. The pressure of the biogas pretreated and supplied to the purification part was regulated to be 11 bar. The pressure of the permeation part of the first polysulfone hollow fiber membrane and the second polysulfone hollow fiber membrane was maintained as 0.5 bar. The ratio of area of the first polysulfone hollow fiber membrane, the second polysulfone hollow fiber membrane, and the third polysulfone hollow fiber membrane was 1:2:1. The flow rate of the supplied biogas for the membrane separation process was 100 L/min. The results are shown in Table 4.

TABLE 4

| operation temperature (° C.) | supply flow rate (L/min) | supply pressure (bar) | area ratio of first polysulfone hollow fiber membrane:second polysulfone hollow fiber membrane:third polysulfone hollow fiber membrane | | second polysulfone hollow fiber membrane residue part | third polysulfone hollow fiber membrane permeation part | recovery rate (%) |
|---|---|---|---|---|---|---|---|
| −15 | 100 | 11 | 1:2:1 | flow rate (L/min) | 73.7 | | 98.6 |
| | | | | methane concentration (%) | 97.2 | 9.2 | |
| | | | | carbon dioxide concentration (%) | 2.8 | 90.8 | |
| 10 | | | | flow rate (L/min) | 71.5 | | 96.2 |
| | | | | methane concentration (%) | 96.7 | 5.9 | |
| | | | | carbon dioxide concentration (%) | 3.3 | 94.1 | |
| 15 | | | | flow rate (L/min) | 68.0 | | 89.6 |
| | | | | methane concentration (%) | 95.6 | 4.2 | |
| | | | | carbon dioxide concentration (%) | 4.4 | 95.8 | |
| 35 | | | | flow rate (L/min) | 57.8 | | 81.9 |
| | | | | methane concentration (%) | 91.3 | 1.6 | |
| | | | | carbon dioxide concentration (%) | 8.7 | 98.4 | |

As shown in Table 4, high purity methane (at least 95%) was separated with high recovery rate (at least 90%) when the temperature of the compressed biogas was lower than 10° C. The purity of methane was decreased as the operation temperature was increased up to 35° C. As the operation temperature was increased, the permeability of the polysulfone hollow fiber membrane was increased and accordingly the flow rate of the residue part of the second polysulfone hollow fiber membrane was reduced, resulting in the decrease of the recovery rate.

EXPERIMENTAL EXAMPLE 4

Methane Gas Separation Efficiency according to Area Ratio of First Polysulfone Hollow Fiber Membrane, Second Polysulfone Hollow Fiber Membrane, and Third Polysulfone Hollow Fiber Membrane Investigation of the methane gas separation efficiency of the method for separating methane gas of the present invention according to the area ratio of the first polysulfone hollow fiber membrane, the second polysulfone hollow fiber membrane, and the third polysulfone hollow fiber membrane To investigate the methane gas separation efficiency of the method for separating methane gas of the present invention according to the area ratio of the first polysulfone hollow fiber membrane, the second polysulfone hollow fiber membrane, and the third polysulfone hollow fiber membrane, the following experiment was performed.

Methane gas was purified from the biogas generated in the food waste disposal facility located in Paju City Facilities Management Cooperation by using the membrane separation module made of polysulfone (carbon dioxide/methane selectivity: 25, carbon dioxide permeability: 100 GPU). The composition of the biogas supplied thereto was as follows: methane (65~75 volume %), carbon dioxide (25~35 volume %), hydrogen sulfide (1500 ppm~2500 ppm), siloxane (90 ppm~100 ppm), and moisture (3500 ppm~4500 ppm). The supplied biogas was pretreated to reduce the concentrations of hydrogen sulfide and siloxane under 20 ppm and 0.1 ppb respectively. The dew point temperature was adjusted to −15° C. After dehumidification, the temperature was maintained at 10° C. The pressure of the biogas pretreated and supplied to the purification part was regulated to be 8 bar. The pressure of the permeation part of the first polysulfone hollow fiber membrane and the second polysulfone hollow fiber membrane was maintained as 1 bar. The ratio of area of the first polysulfone hollow fiber membrane, the second polysulfone hollow fiber membrane, and the third polysulfone hollow fiber membrane was 2:1:1 and 1:1:1~1:7:1. The flow rate of the supplied biogas for the membrane separation process was 100 L/min. The results are shown in Table 5.

TABLE 5

| operation temperature (° C.) | supply flow rate (L/min) | supply pressure (bar) | area ratio of first polysulfone hollow fiber membrane:second polysulfone hollow fiber membrane:third polysulfone hollow fiber membrane | | second polysulfone hollow fiber membrane residue part | third polysulfone hollow fiber membrane permeation part | recovery rate (%) |
|---|---|---|---|---|---|---|---|
| 10 | 100 | 8 | 2:1:1 | flow rate (L/min) | 77.6 | | 84.6 |
| | | | | methane concentration (%) | 92.3 | 3.2 | |
| | | | | carbon dioxide concentration (%) | 7.7 | 96.8 | |
| | | | 1:1:1 | flow rate (L/min) | 69.9 | | 92.2 |
| | | | | methane concentration (%) | 97.1 | 4.6 | |
| | | | | carbon dioxide concentration (%) | 2.9 | 95.4 | |
| | | | 1:3:1 | flow rate (L/min) | 70.0 | | 98.3 |
| | | | | methane concentration (%) | 96.8 | 96.8 | |
| | | | | carbon dioxide concentration (%) | 3.2 | 3.2 | |
| | | | 1:4:1 | flow rate (L/min) | 68.9 | | 95.1 |
| | | | | methane concentration (%) | 97.1 | 1.8 | |
| | | | | carbon dioxide concentration (%) | 2.9 | 98.2 | |

TABLE 5-continued

| operation temperature (° C.) | supply flow rate (L/min) | supply pressure (bar) | area ratio of first polysulfone hollow fiber membrane:second polysulfone hollow fiber membrane:third polysulfone hollow fiber membrane | | second polysulfone hollow fiber membrane residue part | third polysulfone hollow fiber membrane permeation part | recovery rate (%) |
|---|---|---|---|---|---|---|---|
| | | | 1:5:1 | flow rate (L/min) | 68.4 | | 93.7 |
| | | | | methane concentration (%) | 97.4 | 2.4 | |
| | | | | carbon dioxide concentration (%) | 2.6 | 97.6 | |
| | | | 1:7:1 | flow rate (L/min) | 60.9 | | 81.6 |
| | | | | methane concentration (%) | 98.3 | 6.8 | |
| | | | | carbon dioxide concentration (%) | 1.7 | 93.2 | |

As shown in Table 5, when the area ratio of the first polysulfone hollow fiber membrane, the second polysulfone hollow fiber membrane, and the third polysulfone hollow fiber membrane was increased from 1:1:1 to 1:3:1, the purity and recovery rate of the final methane product collected from the residue part of the second polysulfone hollow fiber membrane were increased and when the area ratio was increased further to 1:4:1~1:5:1, the purity of the final methane product was increased but the recovery rate was gradually decreased. Therefore, in order to separate high purity methane (at least 95%) with high recovery rate (at least 90%), the area ratio of the first polysulfone hollow fiber membrane, the second polysulfone hollow fiber membrane, and the third polysulfone hollow fiber membrane was preferably 1:1:1~1:5:1.

Hereinafter, the multi-stage membrane separation and purification process and the apparatus for separating high purity methane gas according to another example of the present invention are described.

In another example of the present invention, the method includes the steps of compressing and cooling biogas (step 1); and separating carbon dioxide by introducing the biogas compressed and cooled in step 1 into the polymer separation membrane (step 2). Herein, step 2 is to separate carbon dioxide by introducing the biogas compressed and cooled in step 1 into the 4-stage polymer separation membrane system for gas separation wherein the residue stream of the first polymer separation membrane is connected to the second polymer separation membrane; the residue stream of the second polymer separation membrane is connected to the third polymer separation membrane; and the permeate stream of the second polymer separation membrane is connected to the fourth polymer separation membrane.

The present invention provides a method for separating high purity methane gas from biogas comprising the following steps:
compressing and cooling biogas (step 1); and
separating carbon dioxide by introducing the biogas compressed and cooled in step 1 into the four-stage polymer separation membrane system for gas separation (step 2) wherein the residue stream of the first polymer separation membrane is connected to the second polymer separation membrane; the residue stream of the second polymer separation membrane is connected to the third polymer separation membrane; and the permeate stream of the second polymer separation membrane is connected to the fourth polymer separation membrane.

Hereinafter, the method for separating high purity methane gas from biogas of the present invention is described in more detail, step by step.

First, in the method for separating high purity methane gas from biogas of the present invention, step 1 is to compress and cool biogas.

Step 1 above is to compress and cool biogas, wherein the pressure and temperature is properly adjusted to perform the membrane separation process in order to separate high purity methane gas from biogas.

At this time, the compression and cooling in step 1 is performed preferably at the biogas temperature of −20° C.~30° C. If the temperature of the compressed and cooled biogas of step 2 is lower than −20° C., the selectivity of the polymer separation membrane would be increased, but cooling costs using the membrane separation apparatus would be increased. In particular, at that temperature, the separation membrane would be frozen and accordingly easily broken by any pressure. On the other hand, if the temperature is higher than 10° C., the selectivity of the polymer separation membrane would be significantly reduced, and accordingly the recovery rate and purity of methane would be decreased, and further the separation membrane might be damaged by heat.

The compression and cooling in step 1 is preferably performed with the biogas pressure of 3~11 bar and 5~30 bar is more preferred. If the pressure of the biogas compressed and cooled in step 1 is less than 3 bar, the selectivity of the polymer separation membrane would be reduced because of the decreased pressure ratio of the upper part pressure and the lower part pressure in the course of the membrane separation process, resulting in the significant decrease of methane purity and yield. If the pressure of the biogas is more than 100 bar, the selectivity would be decreased according to the plasticization caused by carbon dioxide in the course of the membrane separation process, resulting in the decrease of methane purity and yield and further in the damage of the separation membrane.

Further, the biogas of step 1 can include such impurities as 0.0001%~0.1% moisture, hydrogen sulfide, ammonia, siloxane, nitrogen, and oxygen. The composition of the biogas supplied in step 1 is mainly composed of methane (65~75 volume %) and carbon dioxide (25~35 volume %), and contains some minor ingredients such as hydrogen sulfide (1500~2500 ppm), siloxane (90~100 ppm), and moisture (3500~4500).

At this time, the biogas of step 1 can be pre-treated by the processes of dehumidification, desulfurization, deammonia, and desiloxane.

The biogas of step 1 can be pre-treated and at this time it is preferred to perform the dehumidification treatment first. The said dehumidification treatment is preferably performed first before the dry desulfurization and desiloxane treatment in order to protect a desulfurizing agent and a desiloxane agent. By the dehumidification treatment, the early termination of performance or poor performance by coagulation in adsorbents caused by moisture can be prevented. If the dry desulfurization or deammonia process is applied, the dehumidification treatment of biogas is preferably performed at the end of the wet process, which favors protecting the permeability of a separation membrane. The dehumidification treatment herein can be performed by making the biogas pass through the cylindrical dehumidifier equipped with a circulation tube through which cooling water provided from an outer chiller is circulating, but not always limited thereto.

When the dehumidification is performed, the dew point temperature of gas is preferably 0° C. or under, and more preferably −15° C.~−50° C. If the dew point temperature of the dehumidified gas is over 0° C., there would be a risk of corrosion in the device in the continued process and coagulation in various adsorbents would be observed in the course of the compression process thereafter, resulting in the poor performance. Therefore, the produced final methane gas might not be used as an automobile fuel.

The desulfurization herein is performed by dry desulfurization or wet desulfurization. Hydrogen sulfide included in the biogas generates foul smell and corrodes the machine, so that it needs to be eliminated. At this time, the dry desulfurization process is environmentally friendly compared with the wet desulfurization process, and the economic feasibility of the process is excellent because no additional waste water treatment process is required.

The desulfurization is performed by using an iron oxide tower and the desiloxane treatment is performed by using an impregnated activated carbon tower and a silica gel tower. Silica ($SiO_2$) is generated over the long haul and forms a solid impurities on the surface of siloxane by high heat generated in the compressor cylinder or by being burning in the engine when the finally produced methane gas is used as an automotive fuel, resulting in the short life of purification process device or engine parts. So, the pre-treatment to eliminate siloxane is necessary. Iron oxide adsorbent adsorbs a large amount of hydrogen sulfide. Ammonia that has not been adsorbed is adsorbed by impregnated activated carbon adsorbent, and some siloxanes are also adsorbed. Finally, siloxane is adsorbed and removed in the silica gel tower. Thus, the desulfurization and desiloxane process can be operated without degrading the desulfurization and desiloxane performance even in an urgent situation, compared with the conventional desulfurization process composed of a single adsorbent, and each adsorbent can complement each other's functions.

The desulfurization and desiloxane treatment is preferably performed to make the concentration of hydrogen sulfide up to 20 ppm and the concentration of siloxane up to 0.1 ppb after the treatment. If hydrogen sulfide is included in the final product at the concentration exceeding 20 ppm, the product would smell stench and cause corrosion in the device when it is used as a fuel. If the concentration of siloxane is higher than 0.1 ppb, silica ($SiO_2$) is generated over the long haul and form a solid impurities on the surface by high heat generated in the compressor cylinder or by being burning in the engine when the finally produced methane gas is used as an automotive fuel, resulting in the short life of the purification process device or engine parts.

Deammonia treatment can be performed together with the desulfurization and desiloxane treatment. The biogas supplied in step 1 can include ammonia which can be removed by deammonia treatment.

In the method for separating high purity methane gas from biogas of the present invention, step 2 is to separate carbon dioxide by introducing the biogas compressed and cooled in step 1 into the 4-stage polymer separation membrane system for gas separation wherein the residue stream of the first polymer separation membrane is connected to the second polymer separation membrane, the residue stream of the second polymer separation membrane is connected to the third polymer separation membrane, and the permeate stream of the second polymer separation membrane is connected to the fourth polymer separation membrane.

In step 2, methane and carbon dioxide can be separated from the biogas compressed and cooled in step 1 by using the 4-stage polymer separation membrane system for gas separation. At this time, the 4-stage polymer separation membrane system comprises the first polymer separation membrane, the second polymer separation membrane, the third polymer separation membrane, and the fourth polymer separation membrane, wherein the residue stream of the first polymer separation membrane is connected to the second polymer separation membrane, the residue stream of the second polymer separation membrane is connected to the third polymer separation membrane, and the permeate stream of the second polymer separation membrane is connected to the fourth polymer separation membrane.

Particularly, the material used for the membrane separation process to separate carbon dioxide in step 2 is preferably selected among high selectivity materials and medium selectivity polymers having the carbon dioxide/methane selectivity of 20~100, and more preferably 20~60. The material is preferably an amorphous or semi-crystalline polymer, which is exemplified by polyimide, polyamide, polyethersulfone, polysulfone, polycarbonate, polyethylene terephthalate, cellulose acetate, polyphenylene oxide, poly siloxane, polyethylene oxide, polypropylene oxide, and a mixture thereof. Any synthetic polymer having a reduced selectivity in order to increase the carbon dioxide permeability in the process of manufacturing a separation membrane material can be included herein.

At this time, it is preferable that the permeability of carbon dioxide is 100 GPU to 1,000 GPU in the case of a separation membrane in which a selective layer is processed into a thin film by a phase transfer method or a thin film coating method using an asymmetric composite membrane or a hollow fiber membrane. The unit for the permeability of carbon dioxide, GPU, indicates gas permission unit (1 $GPU=(10^{-6} \cdot cm^3)/(cm^2 \cdot sec \cdot mmHg)$), that is it indicates the volume (cm³) of carbon dioxide that passes through a certain unit area (cm²) of a separation membrane under a unit pressure (mmHg) for a designated unit time (sec).

The separation membrane material used in this invention can include a variety of materials, unlike the three-stage process mainly using high selectivity polymer materials, such as polyimide and polyethersulfone having as high carbon dioxide/methane selectivity as 40 and polysulfone, cellulose acetate, and polycarbonate having the medium selectivity of 20~34. The separation membrane materials such as polyethersulfone and polyimide have high selectivity but have low carbon dioxide permeability. In this invention, polysulfone that has a medium selectivity but has more excellent plasticization resistance against carbon dioxide than polyimide is used. If a separation membrane material that has a very low selectivity is used, a large amount of recirculating gas would be required to obtain high purity methane, indicating that energy consumption would be increased. On the other hand, a material having a high selectivity is used, the permeability would be generally lowered, so that the yield of high purity methane would not be as much and on the contrary the volume of recirculating gas would be bigger, which requires high pressure operation and accordingly requires a large scale facility. For that reasons, a separation membrane material having a medium selectivity is preferred. In particular, a polymer material such as polysulfone having higher resistance against plasticization caused by pressure than polyimide is more preferred, but not always limited thereto.

The difference of the pressure between the permeation part and the residue part of each of the first polymer separation membrane, the second polymer separation membrane, the third polymer separation membrane, and the fourth polymer separation membrane in step 2 is preferably adjusted in the range of 1~50 bar, and more preferably in the range of 5~30 bar. In particular, the permeation driving force can be applied to the separation process by reducing the pressure of the permeation part lower than the upper part pressure. As the upper part pressure goes high, the consumption of the separation membrane is reduced. If the difference of the pressure between the permeation part and the residue part of each of the first, the second, the third, and the fourth polymer separation membrane is less than 1 bar, the permeability of the separation membrane would be lowered so that the selectivity of the separation membrane is not fully functioning, resulting in the low yield of final product and instead high recirculation rate of methane gas. Accordingly, the production cost and the energy cost of the plant are increased. On the other hand, if the pressure difference is bigger than 50 bar, the cost of the compressor and the piping cost are excessive and there is also a risk of explosion.

The upper part pressure of the biogas supplied to each of the first, the second, the third, and the fourth polymer separation membrane in step 2 is preferably 3 bar~100 bar, and more preferably 5 bar~30 bar. If the pressure of the biogas supplied to each of the first, the second, the third, and the fourth polymer separation membrane in step 2 is less than 3 bar, the selectivity of the polymer separation membrane would be reduced, resulting in the decrease of the pressure ratio of the upper part pressure/the lower part pressure in the membrane separation process, suggesting that the recovery rate and purity of methane would be significantly reduced. If the pressure is more than 100 bar, the selectivity is also reduced because of the plasticization caused by carbon dioxide in the membrane separation process and accordingly the recovery rate and purity of methane would be reduced or the separation membrane could be broken.

The process efficiency such as the carbon dioxide concentration and the recovery rate can be controlled by regulating the area ratio of the first polymer separation membrane, the second polymer separation membrane, the third polymer separation membrane, and the fourth polymer separation membrane. As an example, if the methane concentration in the biogas supplied is as high as 60~80%, it is preferred for better yield to regulate the area of the first polymer separation membrane and the fourth polymer separation membrane to be much lower than the area of the second polymer separation membrane and the third polymer separation membrane in the area ratio of them. If the concentration of methane in the biogas supplied is as low as 40~60%, it is preferred for better yield to regulate the area of the first polymer separation membrane and the fourth polymer separation membrane to be a little lower than that of the second polymer separation membrane and the third polymer separation membrane.

More specifically, if the concentration of methane in the biogas supplied is as high as 60~80%, the area ratio of the first polymer separation membrane, the second polymer separation membrane, the third polymer separation membrane, and the fourth polymer separation membrane is preferably 1:2~5:2~8:1~5. If the concentration of methane in the biogas supplied is as low as 40~60%, the area ratio of the first polymer separation membrane, the second polymer separation membrane, the third polymer separation membrane, and the fourth polymer separation membrane is preferably 1:3~7:8~12:2~8, but not always limited thereto.

As the concentration of methane in the biogas supplied is decreased, the area of the first polymer separation membrane of step 2 can be adjusted to give high purity methane. That is, the area of the first polymer separation membrane can be regulated by the concentration of methane included in the biogas supplied in step 1 and as a result, high purity methane gas can be efficiently purified.

Further, if the concentration of methane included in the biogas supplied in step 1 is as high as about 60~80%, the methane gas separation process can be performed through by-pass connected directly to the second polymer separation membrane without being through the first separation membrane. Such by-pass line is helpful to increase energy efficiency even more and technical flexibility is accepted according to the variants in the methane separation process.

The method for separating high purity methane gas from biogas of the present invention can additionally include the step of recirculating the permeate stream of the third polymer separation membrane and the residue stream of the fourth polymer separation membrane back to the stage before the compression process of step 1 (step 3).

The method of the present invention can increase the recovery rate of methane gas by containing the additional step (step 3) above. The permeate stream of the third polymer separation membrane and the residue stream of the fourth polymer separation membrane can be recirculated back to the compression and cooling stage, and this process can be included as an additional step in the method of the invention.

To increase the recovery rate of methane gas, the permeate stream of the third polymer separation membrane and the residue stream of the fourth polymer separation membrane can be recirculated back to the compression and cooling stage, and the membrane separation process can be repeated. At this time, when the methane concentration in the gas coming through the permeation part of the fourth polymer separation membrane is at least 5%, it is incinerated, or when the concentration is less than 1%, it is compressed and stored in a separate storage facility. The concentration of carbon dioxide coming through the separation process is preferably up to 1 volume %. The high purity carbon dioxide coming through the permeation part of the fourth polymer separation membrane is separated and be utilized later.

The method of the invention has another advantage of using the high purity carbon dioxide obtained through the permeation part of the first polymer separation membrane.

The present invention also provides an apparatus for purifying methane gas comprising:

supply part to supply biogas;

compression and cooling part to compress and cool down the biogas supplied from the supply part; and purification part containing the 4-stage polymer separation membrane system for gas separation to separate carbon dioxide from the gas compressed and cooled down in the compression and cooling part wherein the residue stream of the first polymer separation membrane is connected to the second polymer separation membrane, the residue streams of the second polymer separation membrane is connected to the third polymer separation membrane, and the permeate stream of the second polymer separation membrane is connected to the fourth polymer separation membrane.

Figure 2:
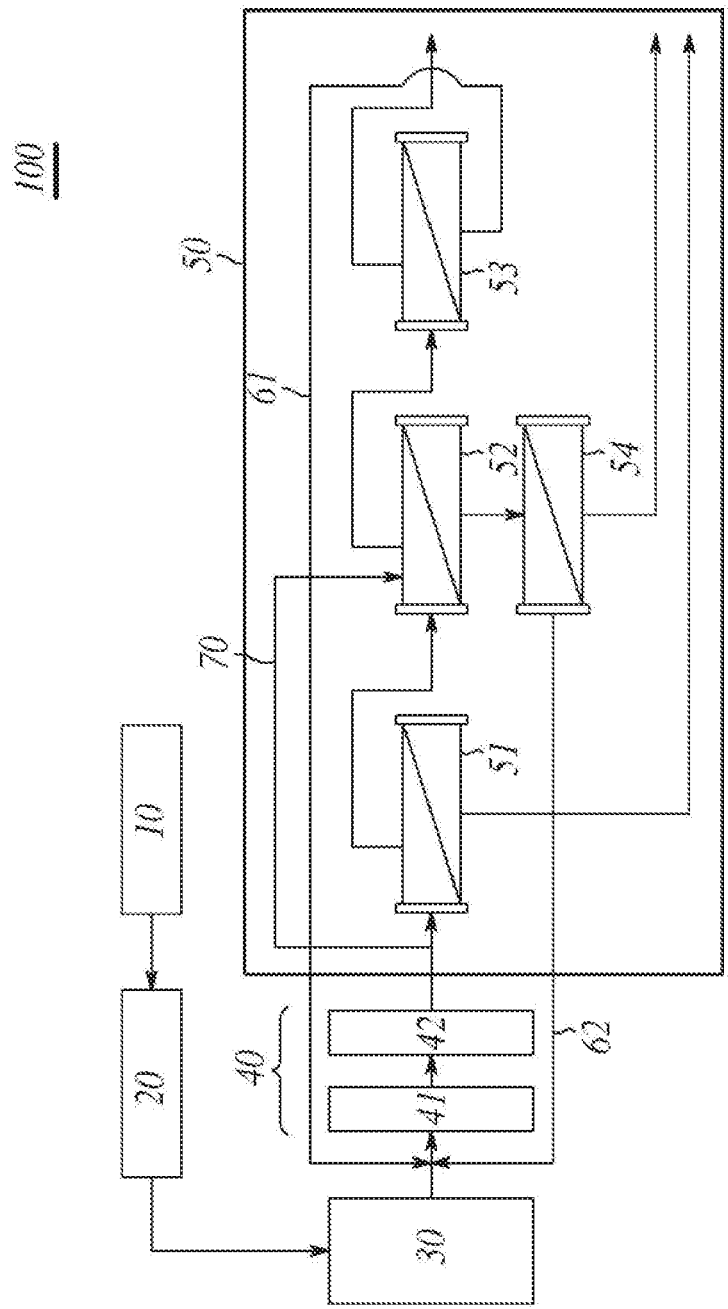
FIG. 2 is a schematic diagram illustrating an example of a methane gas purification device according to another example of the present invention.

FIG. 2 presents a diagram illustrating an example of the apparatus for purifying methane gas of the present invention. Hereinafter, the apparatus for purifying methane gas of the present invention is described in more detail with referring to FIG. 2.

In the apparatus for purifying methane gas of the present invention 100, the supply part 10 can be a device for the introduction of the biogas generated in a food-waste disposal site, a sewage treatment plant, a landfill site, and a wastewater treatment plant into the apparatus for purifying methane gas of the present invention, which is exemplified by a blower.

The apparatus for purifying methane gas of the present invention 100 can contain the dehumidification part 20 and the pretreatment part 30 to eliminate sulfur, ammonia, and siloxane from the dehumidified gas. The dehumidification part 20 is not limited to a specific device and can be a cylindrical dehumidifier having a tube in which cooling water supplied from an external cooling device is circulated.

The pretreatment part 30 is to eliminate sulfur, ammonia, and siloxane from the dehumidified gas provided from the dehumidification part 20 can include the desulfurization device and the desiloxane device. At this time, the desulfurization device can include an iron oxide tower and the desiloxane device can include an iron oxide tower, an impregnated activated carbon tower, and a silica gel tower. Each device for the desiloxane treatment can be connected in series or in parallel. Iron oxide adsorbent adsorbs a large amount of hydrogen sulfide. Hydrogen sulfide that has not been adsorbed is adsorbed by impregnated activated carbon adsorbent, and some siloxanes are also adsorbed. The said desulfurization and desiloxane device can be operated without degrading the desulfurization and desiloxane performance even in an urgent situation, compared with the conventional desulfurization and desiloxane device composed of a single adsorbent, and each adsorbent can complement each other's functions.

In the apparatus for purifying methane gas of the present invention 100, the compression and cooling part 40 is a device for compressing and cooling biogas to make it suitable for the membrane separation process, which is though not limited to a specific compression and cooling device and any device that can compress and cool down gas can be used.

The compression and cooling part 40 is composed of the compression part 41 and the cooling part 42. The compression part 41 is to compress the biogas pretreated above in order to make it have a suitable pressure to fit the inlet pressure of the membrane separation process. At this time, the pressure of the compressed biogas is preferably 3~100 bar. If the pressure of the biogas compressed in the compression part is less than 3 bar, the selectivity of the polymer separation membrane would be reduced, resulting in the decrease of the pressure ratio of the upper part pressure/the lower part pressure in the membrane separation process, suggesting that the recovery rate and purity of methane would be significantly reduced. If the pressure is more than 100 bar, the selectivity is also reduced because of the plasticization caused by carbon dioxide in the membrane separation process and accordingly the recovery rate and purity of methane would be reduced or the separation membrane could be broken. On the other hand, if the pressure difference is bigger than 50 bar, the cost of the compressor and the piping cost are excessive and there is also a risk of explosion. In addition, there is a problem that the constructing cost of the plant and the risk of explosion are increased due to the high pressure.

The cooling part 42 is to cool down the biogas in order to make it fit for the inlet temperature for the membrane separation process. The temperature of the cooled down gas is preferably −20° C.~30° C. If the temperature of the biogas cooled down in the cooling part above is lower than −20° C., the selectivity of the polymer separation membrane would be high but the costs for the cooling system of the membrane separation apparatus would be increased. In particular, the separation membrane would be frozen to break easily under pressure. If the temperature above is over 30° C., the selectivity of the polymer separation membrane would be significantly reduced, and therefore the recovery rate and purity of methane would be lowered, too. Also, the separation membrane would be damaged by heat.

The cooling part 42 is functioning to prevent the increase of the biogas temperature caused by the heat of compression generated in the course of compressing biogas, and to cool down thereof, so that it is contributed to the increase of the production efficiency of the final methane product.

In the apparatus for purifying methane gas of the present invention 100, the purification part 50 is to separate methane and carbon dioxide by introducing the biogas compressed and cooled in the compression and cooling part 40 into the first polymer separation membrane 51, the second polymer separation membrane 52, the third polymer separation membrane 53, and the fourth polymer separation membrane 54.

The material used for the polymer separation is preferably a polymer material having the carbon dioxide/methane selectivity of 20~100. An amorphous or semi-crystalline polymer is more preferred for the material, which is exemplified by polysulfone, polycarbonate, polyethylene terephthalate, cellulose acetate, polyphenylene oxide, poly siloxane, polyethylene oxide, polypropylene oxide, and a mixture thereof. A polymer designed to have low selectivity to increase the permeability of carbon dioxide in the course of the production of a separation membrane material can be included in the criteria of the material.

At this time, it is preferable that the permeability of carbon dioxide is 10 GPU~1000 GPU, and more preferably 100~1000 GPU in the case of a separation membrane in which a selective layer is processed into a thin film by a phase transfer method or a thin film coating method using an asymmetric composite membrane or a hollow fiber membrane. The unit for the permeability of carbon dioxide, GPU, indicates gas permission unit (1 GPU=($10^{-6} \cdot cm^3$)/($cm^2 \cdot sec \cdot mmHg$)), that is it indicates the volume ($cm^3$) of carbon dioxide that passes through a certain unit area ($cm^2$) of a separation membrane under a unit pressure (mmHg) for a designated unit time (sec).

The separation membrane materials such as polyethersulfone and polyimide have a high carbon dioxide/methane selectivity (at least 40), but have a low carbon dioxide permeability. In this invention, polysulfone that has a medium selectivity but has more excellent plasticization resistance against carbon dioxide than polyimide is used. If a separation membrane material that has a very low selectivity is used, a large amount of recirculating gas would be required to obtain high purity methane, indicating that energy consumption would be increased. On the other hand, a material having a high selectivity is used, the permeability would be generally lowered, so that the yield of high purity methane would not be as much and on the contrary the volume of recirculating gas would be bigger, which requires high pressure operation and accordingly requires a large scale facility. For that reasons, a separation membrane material having a medium selectivity is preferred. In particular, a polymer material such as polysulfone having higher resistance against plasticization caused by pressure than polyimide is more preferred, but not always limited thereto.

The difference of the pressure between the permeation part and the residue part of each of the first polymer separation membrane 51, the second polymer separation membrane 52, the third polymer separation membrane 53, and the fourth polymer separation membrane 54 is preferably adjusted in the range of 1~50 bar, and more preferably in the range of 5~30 bar. In particular, the permeation driving force can be applied to the separation process by reducing the pressure of the permeation part lower than the upper part pressure. As the upper part pressure goes high, the consumption of the separation membrane is reduced. If the difference of the pressure between the permeation part and the residue part of each of the first, the second, the third, and the fourth polymer separation membrane is less than 1 bar, the permeability of the separation membrane would be lowered so that the selectivity of the separation membrane is not fully functioning, resulting in the low yield of final product and instead high recirculation rate of methane gas. Accordingly, the production cost and the energy cost of the plant are increased. On the other hand, if the pressure difference is bigger than 100 bar, the cost of the compressor and the piping cost are excessive and there is also a risk of explosion.

The process efficiency such as the carbon dioxide concentration and the recovery rate can be controlled by regulating the area ratio of the first polymer separation membrane 51, the second polymer separation membrane 52, the third polymer separation membrane 53, and the fourth polymer separation membrane 54. As an example, if the methane concentration in the biogas supplied is as high as 60~80%, it is preferred for better yield to regulate the area of the first polymer separation membrane and the fourth polymer separation membrane to be much lower than the area of the second polymer separation membrane and the third polymer separation membrane in the area ratio of them. If the concentration of methane in the biogas supplied is as low as 40~60%, it is preferred for better yield to regulate the area of the first polymer separation membrane and the fourth polymer separation membrane to be a little lower than that of the second polymer separation membrane and the third polymer separation membrane.

More specifically, if the concentration of methane in the biogas supplied is as high as 60~80%, the area ratio of the first polymer separation membrane, the second polymer separation membrane, the third polymer separation membrane, and the fourth polymer separation membrane is preferably 1:2~5:2~8:1~5. If the concentration of methane in the biogas supplied is as low as 40~60%, the area ratio of the first polymer separation membrane, the second polymer separation membrane, the third polymer separation membrane, and the fourth polymer separation membrane is preferably 1:3~7:8~12:2~8, but not always limited thereto.

As the concentration of methane in the biogas supplied is decreased, the area of the first polymer separation membrane 51 can be adjusted to give high purity methane. That is, the area of the first polymer separation membrane can be regulated by the concentration of methane included in the biogas supplied and as a result, high purity methane gas can be efficiently purified.

Further, if the concentration of methane included in the biogas supplied in step 1 is as high as about 60~80%, the methane gas separation process can be performed through by-pass 70 connected directly to the second polymer separation membrane 52 without being through the first separation membrane 51. Such by-pass line is helpful to increase energy efficiency even more and technical flexibility is accepted according to the variants in the methane separation process.

The apparatus for purifying methane gas of the present invention 100 preferably includes the first recirculation line 61 and the second recirculation line 62 to recirculate the permeate stream of the third polymer separation membrane 53 and the residue stream of the fourth polymer separation membrane 54 in the purification part 50 back to the compression and cooling part 40. The recovery rate of methane can be increased by recovering methane again by recirculating methane in the permeate stream.

The method for separating high purity methane gas from biogas is described in more detail hereinafter by referring the apparatus for purifying methane 100. Particularly, biogas is supplied from the biogas supply part 10. Moisture, sulfur, ammonia, and siloxane are eliminated when the biogas is traveling through the dehumidification part 20 and the pretreatment part 30. The pretreated biogas is compressed and cooled down at a proper pressure and temperature in the compression and cooling part 40.

Next, when the biogas is supplied to the first polymer separation membrane 51 of the purification part 50, carbon dioxide included in the biogas exits the permeation part of the first polymer separation membrane and methane passes through the residue part of the first polymer separation membrane. At this time, a certain amount of carbon dioxide still included in the gas that passes through the residue part of the first polymer separation membrane. The biogas containing carbon dioxide residue is supplied again to the second polymer separation membrane 52. Most carbon dioxide in the biogas provided above passes through the permeation part of the second polymer separation membrane and moves to the fourth polymer separation membrane 54 and methane passes through the residue part of the second polymer separation membrane. In the meantime, carbon dioxide can be still included in the biogas supplied to the residue part of the second polymer separation membrane. This gas containing carbon dioxide residue is supplied to the third polymer separation membrane 53. Most carbon dioxide in the biogas provided above passes through the permeation part of the third polymer separation membrane and the biogas passing through the residue part of the third polymer membrane can yield high purity methane (at least 95%).

In the meantime, carbon dioxide included in the biogas supplied to the fourth polymer separation membrane 54 through the permeation part of the second polymer separation membrane 52 passes through the fourth polymer separation membrane and the gas coming out through the permeation part of the fourth polymer separation membrane is directly incinerated or transferred to the process for the collection of high purity carbon dioxide. At this time, the concentration of carbon dioxide coming out through the permeation part of the fourth polymer separation membrane is preferably at least 90% and more preferably 95~99%. If the concentration of carbon dioxide in the gas is less than 90%, the production efficiency of methane gas would be reduced. The gas passing through the permeation part of the third polymer separation membrane 53 and the gas moved to the residue part of the fourth polymer separation membrane are supplied to the compression and cooling part through the recirculation lines 61, 62 connected to the compression and cooling part, leading to the production of even higher purity methane gas.

If the concentration of methane included in the biogas is variable, high purity methane gas could be purified by regulating the area of the first polymer separation membrane 51. That is, according to the concentration of methane in the biogas supplied, the area of the first polymer separation membrane can be regulated to purify high purity methane gas efficiently.

Further, if the concentration of methane included in the biogas supplied is as high as about 60~80%, the methane gas separation process can be performed through by-pass 70 connected directly to the second polymer separation membrane 52 without being through the first separation membrane 51. Such by-pass line is helpful to increase energy efficiency even more and technical flexibility is accepted according to the variants in the methane separation process.

In addition, the present invention provides a methane gas having a purity of at least 95% separated by the above method.

The methane gas having a purity of at least 95% is produced from the biogas generated from food waste and organic substances by the method for separating methane gas of the present invention. The method for separating methane gas of the present invention is a four-stage membrane separation process as described above, which is characterized by the excellent methane yield by recirculating and purifying even a small amount of remaining methane through the four-stage membrane separation process.

Further, the present invention provides an automobile fuel and city gas containing the high purity methane gas above.

The method for separating methane gas of the present invention facilitates the separation of high purity methane by purifying the biogas generated in a food-waste disposal site, a sewage treatment plant, a landfill site, and a wastewater treatment plant and accordingly provides a efficient usability of methane. The purity of the separated methane gas is at least 95% and the recovery rate is at least 90%, and this high purity methane can be separated with low energy costs, low plant costs, and low operation costs. The high purity methane having a purity of at least 95% separated above can be used as an automobile fuel or city gas.

Practical and presently preferred embodiments of the present invention are illustrative as shown in the following Examples and Experimental Example.

However, it will be appreciated that those skilled in the art, on consideration of this disclosure, may make modifications and improvements within the spirit and scope of the present invention.

EXAMPLE 1

Separation of High Purity Methane 1

Step 1: Methane gas was purified from the biogas generated in a food waste disposal facility by using a membrane separation module made of polysulfone. The composition of the biogas supplied thereto was as follows: methane (65~75 volume %), carbon dioxide (25~35 volume %), hydrogen sulfide (1500 ppm~2500 ppm), siloxane (90 ppm~100 ppm), and moisture (3500 ppm~4500 ppm). The supplied biogas was pretreated to reduce the concentrations of hydrogen sulfide and siloxane under 20 ppm and 0.1 ppb respectively. Dehumidification was performed to adjust the dew point temperature to be −5° C. After the dehumidification, the temperature was maintained at 20° C.

Step 2: The pressure of the pretreated biogas supplied to the purification part was regulated to be 11 bar, the pressure of the permeation part of the second polymer separation membrane was regulated to be 3 bar, and the pressure of the permeation part of the third and fourth polymer separation membranes was maintained as 1 bar. The area ratio of the first polymer separation membrane, the second polymer separation membrane, the third polymer separation membrane, and the fourth polymer separation membrane was 1:3:6:1, and the biogas was supplied at 100 L/min for the membrane separation process.

EXAMPLE 2

Separation of High Purity Methane 2

Step 1: Methane gas was purified from the biogas generated in a food waste disposal facility by using a membrane separation module made of polysulfone. The composition of the biogas supplied thereto was as follows: methane (about 45 volume %), carbon dioxide (about 55 volume %), hydrogen sulfide (1500 ppm~2500 ppm), siloxane (90 ppm~100 ppm), and moisture (3500 ppm~4500 ppm). The supplied biogas was pretreated to reduce the concentrations of hydrogen sulfide and siloxane under 20 ppm and 0.1 ppb respectively. Dehumidification was performed to adjust the dew point temperature to be −5° C. After the dehumidification, the temperature was maintained at 10° C.

Step 2: The pressure of the pretreated biogas supplied to the purification part was regulated to be 11 bar, the pressure of the permeation part of the second polymer separation membrane was regulated to be 3 bar, and the pressure of the permeation part of the third and fourth polymer separation membranes was maintained as 1 bar. The area ratio of the first polymer separation membrane, the second polymer separation membrane, the third polymer separation membrane, and the fourth polymer separation membrane was 1:5:10:2, and the biogas was supplied at 100 L/min for the membrane separation process.

COMPARATIVE EXAMPLE 1

Figure 3:
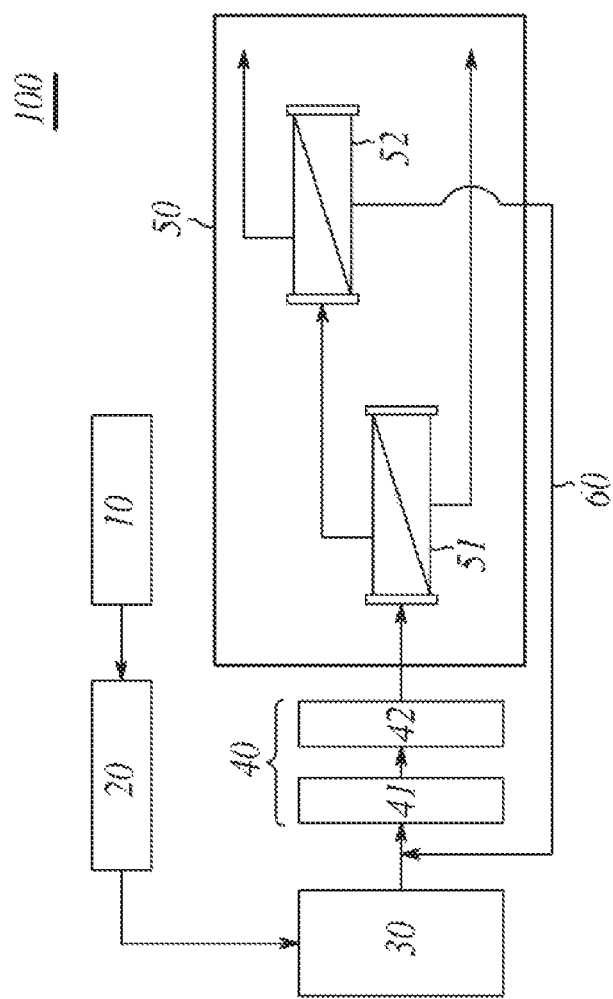
FIG. 3 is a schematic diagram illustrating the two-stage recirculation process.

Step 1: Methane gas was purified from the biogas generated in a food waste disposal facility by using a membrane separation module made of polysulfone. At this time, methane gas was purified by the two-stage recirculation process as shown in FIG. 3. The composition of the biogas supplied thereto was as follows: methane (65~75 volume %), carbon dioxide (25~35 volume %), hydrogen sulfide (1500 ppm~2500 ppm), siloxane (90 ppm~100 ppm), and moisture (3500 ppm~4500 ppm). The supplied biogas was pretreated to reduce the concentrations of hydrogen sulfide and siloxane under 20 ppm and 0.1 ppb respectively. Dehumidification was performed to adjust the dew point temperature to be −5° C. After the dehumidification, the temperature was maintained at 20° C.

Step 2: The pressure of the pretreated biogas supplied to the purification part was regulated to be 11 bar, the pressure of the permeation part of the first polymer separation membrane and the second polymer separation membrane was maintained as 1 bar. The area ratio of the first polymer separation membrane and the second polymer separation membrane was 1:3, and the biogas was supplied at 100 L/min for the membrane separation process.

COMPARATIVE EXAMPLE 2

Figure 4:
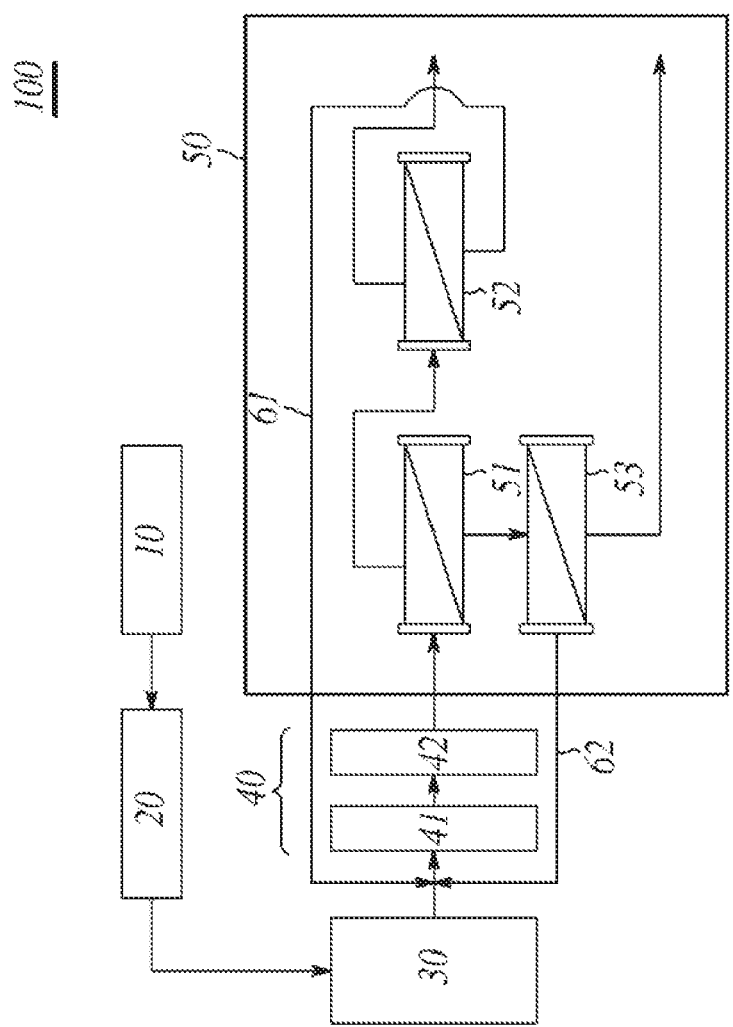
FIG. 4 is a schematic diagram illustrating the three-stage recirculation process.

Step 1: Methane gas was purified from the biogas generated in a food waste disposal facility by using a membrane separation module made of polysulfone. At this time, methane gas was purified by the three-stage recirculation process as shown in FIG. 4. The composition of the biogas supplied thereto was as follows: methane (65~75 volume %), carbon dioxide (25~35 volume %), hydrogen sulfide (1500 ppm~2500 ppm), siloxane (90 ppm~100 ppm), and moisture (3500 ppm~4500 ppm). The supplied biogas was pretreated to reduce the concentrations of hydrogen sulfide and siloxane under 20 ppm and 0.1 ppb respectively. Dehumidification was performed to adjust the dew point temperature to be −5° C. After the dehumidification, the temperature was maintained at 20° C.

Step 2: The pressure of the pretreated biogas supplied to the purification part was regulated to be 11 bar, the pressure of the permeation part of the first polymer separation membrane was regulated to be 3 bar, and the pressure of the permeation part of the second and third polymer separation membranes was maintained as 1 bar. The area ratio of the first polymer separation membrane, the second polymer separation membrane, and the third polymer separation membrane was 1:3:1, and the biogas was supplied at 100 L/min for the membrane separation process.

COMPARATIVE EXAMPLE 3

Step 1: Methane gas was purified from the biogas generated in a food waste disposal facility by using a membrane separation module made of polysulfone. At this time, methane gas was purified by the two-stage recirculation process as shown in FIG. 3. The composition of the biogas supplied thereto was as follows: methane (about 45 volume %), carbon dioxide (about 55 volume %), hydrogen sulfide (1500 ppm~2500 ppm), siloxane (90 ppm~100 ppm), and moisture (3500 ppm~4500 ppm). The supplied biogas was pretreated to reduce the concentrations of hydrogen sulfide and siloxane under 20 ppm and 0.1 ppb respectively. Dehumidification was performed to adjust the dew point temperature to be −5° C. After the dehumidification, the temperature was maintained at 10° C.

Step 2: The pressure of the pretreated biogas supplied to the purification part was regulated to be 11 bar, the pressure of the permeation part of the first polymer separation membrane and the second polymer separation membrane was maintained as 1 bar. The area ratio of the first polymer separation membrane and the second polymer separation membrane was 1:3, and the biogas was supplied at 100 L/min for the membrane separation process.

COMPARATIVE EXAMPLE 4

Step 1: Methane gas was purified from the biogas generated in a food waste disposal facility by using a membrane separation module made of polysulfone. At this time, methane gas was purified by the three-stage recirculation process as shown in FIG. 4. The composition of the biogas supplied thereto was as follows: methane (about 45 volume %), carbon dioxide (about 55 volume %), hydrogen sulfide (1500 ppm~2500 ppm), siloxane (90 ppm~100 ppm), and moisture (3500 ppm~4500 ppm). The supplied biogas was pretreated to reduce the concentrations of hydrogen sulfide and siloxane under 20 ppm and 0.1 ppb respectively. Dehumidification was performed to adjust the dew point temperature to be −5° C. After the dehumidification, the temperature was maintained at 10° C.

Step 2: The pressure of the pretreated biogas supplied to the purification part was regulated to be 11 bar, the pressure of the permeation part of the first polymer separation membrane was regulated to be 3 bar, and the pressure of the permeation part of the second and third polymer separation membranes was maintained as 1 bar. The area ratio of the first polymer separation membrane, the second polymer separation membrane, and the third polymer separation membrane was 1:3:1, and the biogas was supplied at 100 L/min for the membrane separation process.

EXPERIMENTAL EXAMPLE 5

Investigation of Separation Efficiency of Methane Gas

To investigate the separation efficiency of methane gas of the method for separating methane gas of the present invention, the concentrations of methane gas and carbon dioxide and the recovery rate thereof were analyzed after performing the experiments of Example 1, Example 2, and Comparative Examples 1~4. The results are shown in Table 6 below.

As shown in Table 6, the recovery rate was calculated by the following mathematical formula 2 with the amount of the purified methane with the purity of 90~99% from the lower methane supplied.

$$\frac{(\text{residual flow rate} \times \text{methane concentration in residue part})}{(\text{supply flow rate} \times \text{methane concentration in supply part})} \quad \text{Mathematical Formula 2}$$

TABLE 6

|  |  | third polymer separation membrane residue part | fourth polymer separation membrane permeation part | recovery rate (%) |
|---|---|---|---|---|
| Example 1 (4-stage) | flow rate (L/min) | 70.0 |  | 99.4 |
|  | methane concentration (%) | 98.1 | 5.1 |  |
|  | carbon dioxide concentration (%) | 2.9 | 94.9 |  |

TABLE 6-continued

| | | third polymer separation membrane residue part | fourth polymer separation membrane permeation part | recovery rate (%) |
|---|---|---|---|---|
| Example 2 (4-stage) | flow rate (L/min) | 74.2 | | 98.2 |
| | methane concentration (%) | 99.0 | 0.8 | |
| | carbon dioxide concentration (%) | 1.0 | 99.2 | |
| Comparative Example 1 (2-stage) | flow rate (L/min) | 73.4 | | |
| | methane concentration (%) | 90.3 | 10.2 | |
| | carbon dioxide concentration (%) | 9.7 | 89.8 | |
| Comparative Example 2 (3-stage) | flow rate (L/min) | 68.2 | | 89.2 |
| | methane concentration (%) | 93.2 | 8.3 | |
| | carbon dioxide concentration (%) | 6.8 | 91.7 | |
| Comparative Example 3 (2-stage) | flow rate (L/min) | 65.2 | | 80.2 |
| | methane concentration (%) | 95.2 | 8.3 | |
| | carbon dioxide concentration (%) | 4.8 | 92.8 | |
| Comparative Example 4 (3-stage) | flow rate (L/min) | 68.3 | | 89.2 |
| | methane concentration (%) | 94.2 | 8.9 | |
| | carbon dioxide concentration (%) | 5.8 | 91.1 | |

As shown in Table 6, in the two-stage separation membrane process of comparative example 1 performed under the same operation conditions (operation temperature, operation pressure, etc), methane was separated with the purity of 90.3% and the recovery rate of 80.1%. In the three-stage separation membrane process of comparative example 2, methane was separated with the purity of 93.2% and the recovery rate of 89.2%. In the meantime, in the four-stage separation membrane process of example 1 of the present invention, high purity methane was purified with the purity of at least 98% and the recovery rate of 99%. At this time, carbon dioxide was also separated with the purity of at least 95%.

To purity biogas containing methane (about 45%) under the same conditions, the two-stage separation membrane process was performed in comparative example 3. At this time methane was separated with the purity of 95.2% and the recovery rate of 80.2%. In the three-stage separation membrane process of comparative example 4, methane was separated with the purity of 94.2% and the recovery rate of 89.2%. In the meantime, in the four-stage separation membrane process of example 2 of the present invention, high purity methane was purified with the purity of at least 99% and the recovery rate of 98%. At this time, carbon dioxide was also separated with the purity of at least 99%.

As described above, the method for separating high purity methane gas from biogas of the present invention is effective in producing high purity methane from the biogas generated from food waste and organic substances. The method of the present invention is also effective in separating high purity methane gas from different biogases that contain different concentrations of methane gas through the 4-stage membrane separation process. Precisely, the 4-stage membrane separation process can purify even a small amount of remaining methane through recycling thereof, so that the yield of methane can be increased. Further, the method can also facilitate the separation of high purity carbon dioxide as well.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended Claims.

What is claimed is:

1. A method for separating high purity methane gas from biogas comprising the following steps:
   compressing and cooling biogas (step 1); and
   separating carbon dioxide by introducing the biogas compressed and cooled in step 1 into a first polymer separation membrane or a second polymer separation membrane of a four-stage polymer separation membrane system for gas separation, wherein a residue stream of the first polymer separation membrane is connected to the second polymer separation membrane, the residue stream of the second polymer separation membrane is connected to the third polymer separation membrane, and the permeate stream of the second polymer separation membrane is connected to the fourth polymer separation membrane (step 2).

2. The method for separating high purity methane gas from biogas according to claim 1, wherein the polymer separation membrane has a carbon dioxide/methane selectivity of 20 ~100.

3. The method for separating high purity methane gas from biogas according to claim 1, wherein the compression and cooling of step 1 is performed with a biogas pressure of 5 ~100 bar.

4. The method for separating high purity methane gas from biogas according to claim 1, wherein the difference of the pressure between the permeation part and the residue part of each of the first polymer separation membrane, the second polymer separation membrane, the third polymer separation membrane, and the fourth polymer separation membrane in step 2 is adjusted in the range of 5 ~30 bar by adopting a low lower pressure or adopting a reduced pressure condition.

5. The method for separating high purity methane gas from biogas according to claim 1, wherein when the concentration of methane included in the biogas of step 1 is variable, high purity methane gas is purified by regulating the area of the first polymer separation membrane, and the area ratio of the second polymer separation membrane, the third polymer separation membrane, and the fourth polymer separation membrane.

6. The method for separating high purity methane gas from biogas according to claim 1, wherein the method additionally includes the step of recirculating the permeate stream of the third polymer separation membrane and the residue stream of the fourth polymer separation membrane back to the stage before the compression process of step 1 above (step 3).

7. An apparatus for purifying methane gas comprising:
   a supply part to supply biogas;
   a compression and cooling part to compress and cool down the biogas supplied from the supply part; and
   a purification part containing a 4-stage polymer separation membrane system for gas separation to separate carbon dioxide from the gas compressed and cooled down in the compression and cooling part wherein the residue stream of the first polymer separation membrane is connected to the second polymer separation membrane, the residue streams of the second polymer separation membrane is connected to the third polymer separation membrane, and the permeate stream of the second polymer separation membrane is connected to the fourth polymer separation membrane.

8. A methane gas having a purity of at least 95% separated by the method of claim 1.

9. An automobile fuel containing the high purity methane gas of claim 8.

10. A city gas containing the high purity methane gas of claim 8.

* * * * *